(12) United States Patent
Park

(10) Patent No.: US 7,863,365 B2
(45) Date of Patent: Jan. 4, 2011

(54) ROBUST MAGNETIZABLE ELASTOMERIC THERMOPLASTIC BLENDS

(75) Inventor: Edward H. Park, Saline, MI (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 965 days.

(21) Appl. No.: 11/642,700

(22) Filed: Dec. 20, 2006

(65) Prior Publication Data
US 2008/0149881 A1  Jun. 26, 2008

(51) Int. Cl.
*C08K 3/10* (2006.01)
(52) U.S. Cl. .................. 524/403; 524/413; 524/434; 524/440
(58) Field of Classification Search ................ 524/403, 524/413, 435, 440
See application file for complete search history.

(56) References Cited

U.S. PATENT DOCUMENTS

| | | | |
|---|---|---|---|
| 2,968,649 A | 1/1961 | Pailthorp et al. | |
| 2,972,600 A | 2/1961 | Braidwood | |
| 3,287,440 A | 11/1966 | Giller | |
| 3,616,371 A | 10/1971 | Ukihashi et al. | |
| 3,801,552 A | 4/1974 | Kometani et al. | |
| 4,035,565 A | 7/1977 | Apotheker et al. | |
| 4,054,455 A | 10/1977 | Schlesinger et al. | |
| 4,129,617 A | 12/1978 | Machi et al. | |
| 4,233,421 A | 11/1980 | Worm | |
| 4,358,559 A | 11/1982 | Holcomb et al. | |
| 4,446,270 A | 5/1984 | Guenthner et al. | |
| 4,483,951 A | 11/1984 | Brenner | |
| 4,491,536 A | 1/1985 | Tomoda et al. | |
| 4,497,935 A | 2/1985 | St. Clair et al. | |
| 4,507,342 A | 3/1985 | Kielbania | |
| 4,542,573 A | 9/1985 | Bainard | |
| 4,564,662 A | 1/1986 | Albin | |
| 4,566,927 A | 1/1986 | Wood | |
| 4,688,306 A | 8/1987 | Soni et al. | |
| 4,705,741 A | 11/1987 | Lewis et al. | |
| 4,808,665 A | 2/1989 | Patel | |
| 4,849,040 A | 7/1989 | Wood | |
| 4,912,171 A | 3/1990 | Grootaert et al. | |
| 4,985,520 A | 1/1991 | Hayashi et al. | |
| 5,015,526 A | 5/1991 | Kubo et al. | |
| 5,055,539 A | 10/1991 | Hengel et al. | |
| 5,057,345 A | 10/1991 | Barrett | |
| 5,266,400 A | 11/1993 | Yarusso et al. | |
| 5,332,769 A | 7/1994 | Kakimoto | |
| 5,338,588 A | 8/1994 | Billiu | |
| 5,354,811 A | 10/1994 | Kamiya et al. | |
| 5,409,777 A | 4/1995 | Kennedy et al. | |
| 5,523,115 A | 6/1996 | Haidos et al. | |
| 5,530,264 A | 6/1996 | Kataoka et al. | |
| 5,565,284 A | 10/1996 | Koga et al. | |
| 5,591,551 A | 1/1997 | Audett et al. | |
| 5,614,577 A | 3/1997 | Sasaki et al. | |
| 5,730,922 A | 3/1998 | Babb et al. | |
| 5,741,855 A | 4/1998 | Kaduk et al. | |
| 5,843,340 A | 12/1998 | Silvi et al. | |
| 5,883,151 A | 3/1999 | Raetzsch et al. | |
| 5,897,794 A | 4/1999 | Hubbard et al. | |
| 5,952,243 A | 9/1999 | Forester et al. | |
| 5,969,066 A | 10/1999 | Enokida et al. | |
| 5,985,949 A | 11/1999 | Seguchi et al. | |
| 6,043,308 A | 3/2000 | Tanahashi et al. | |
| 6,080,450 A | 6/2000 | Cantor | |
| 6,114,079 A | 9/2000 | Christian et al. | |
| 6,169,125 B1 | 1/2001 | Arnold | |
| 6,177,238 B1 | 1/2001 | Fuller | |
| 6,207,758 B1 | 3/2001 | Brinati et al. | |
| 6,228,943 B1 | 5/2001 | Morikawa et al. | |
| 6,284,412 B1 | 9/2001 | Minakata et al. | |
| 6,323,301 B1 | 11/2001 | Smith et al. | |
| 6,331,586 B1 | 12/2001 | Thielen et al. | |

(Continued)

FOREIGN PATENT DOCUMENTS

CA 2509656 12/2005

(Continued)

OTHER PUBLICATIONS

Electron-Beam Curing of Polymeric Composites as an Enabling Technology for Advanced Manufacturing, E-Beam Services, Inc., presented at Internatl Composites Expo May 10-13, 1999.

(Continued)

*Primary Examiner*—Edward J Cain
(74) *Attorney, Agent, or Firm*—Ronald W. Wangerow; Harness, Dickey & Pierce, P.L.C.

(57) ABSTRACT

Polymeric binder blended from thermoplastic and uncured elastomer binds magnetizable particulate in segmentally magnetizable materials used for encoder targets used in encoders and assemblies where encoders determine rate of motion. The polymeric binder has a dynamic mechanical thermal analyzer tangent delta value (ASTM E 1640-94) not greater than 0.1 at a temperature not less than the liquefaction supra point temperature of the thermoplastic when cured with radiation (preferably electron beam radiation) prior to being blended with either the magnetizable particulate or with other filler materials. The binder effects encoder targets evidencing robustness to thermal or chemical agent stress. Pre-cured blends of magnetizable particulate in the binder evidence good extrusion (pultrusion) performance.

76 Claims, 10 Drawing Sheets

U.S. PATENT DOCUMENTS

| | | | |
|---|---|---|---|
| 6,358,670 B1 | 3/2002 | Wong et al. |
| 6,365,250 B2 | 4/2002 | Shifman et al. |
| 6,419,615 B1 | 7/2002 | Chen et al. |
| 6,437,014 B1 | 8/2002 | Ho et al. |
| 6,482,522 B1 | 11/2002 | Parsonage et al. |
| 6,486,481 B1 | 11/2002 | Tigera |
| 6,489,420 B1 | 12/2002 | Duchesne et al. |
| 6,517,657 B1 | 2/2003 | Kuenzel et al. |
| 6,517,663 B1 | 2/2003 | Kelley et al. |
| 6,533,955 B1 | 3/2003 | Molnar et al. |
| 6,602,959 B2 | 8/2003 | Vestberg et al. |
| 6,624,251 B1 | 9/2003 | Chmielewski |
| 6,652,943 B2 | 11/2003 | Tukachinsky et al. |
| 6,812,624 B1 | 11/2004 | Pei et al. |
| 6,814,584 B2 | 11/2004 | Zaderej |
| 6,823,903 B2 | 11/2004 | Davis |
| 6,838,039 B2 | 1/2005 | Morioka et al. |
| 6,849,314 B2 | 2/2005 | Jing et al. |
| 6,875,394 B2 | 4/2005 | Soulier |
| 6,946,522 B2 | 9/2005 | Jacob et al. |
| 7,022,769 B2 | 4/2006 | Park |
| 7,135,122 B2 | 11/2006 | Park |
| 7,135,527 B2 | 11/2006 | Park |
| 7,151,134 B2 | 12/2006 | Park et al. |
| 7,153,908 B2 | 12/2006 | Park |
| 7,230,038 B2 | 6/2007 | Park |
| 7,244,329 B2 | 7/2007 | Park et al. |
| 7,342,072 B2 | 3/2008 | Park et al. |
| 7,351,769 B2 | 4/2008 | Park |
| 7,381,765 B2 | 6/2008 | Park |
| 7,413,697 B2 | 8/2008 | Park |
| 7,445,725 B2 | 11/2008 | Park |
| 7,449,523 B2 | 11/2008 | Park |
| 7,449,524 B2 | 11/2008 | Park et al. |
| 7,452,577 B2 | 11/2008 | Park |
| 7,521,486 B2 | 4/2009 | Park |
| 7,521,508 B2 | 4/2009 | Park |
| 7,608,216 B2 | 10/2009 | Park et al. |
| 2002/0198320 A1 | 12/2002 | Chmielewski et al. |
| 2003/0004257 A1 | 1/2003 | Kondo et al. |
| 2003/0083616 A1 | 5/2003 | Lee et al. |
| 2003/0125466 A1 | 7/2003 | Chmielewski |
| 2004/0126523 A1 | 7/2004 | Masuda et al. |
| 2004/0157035 A1 | 8/2004 | Guizzetti et al. |
| 2004/0181022 A1 | 9/2004 | Saito |
| 2004/0183702 A1 | 9/2004 | Nachtigal et al. |
| 2004/0201926 A1 | 10/2004 | Hancer et al. |
| 2005/0081989 A1 | 4/2005 | Berezuk et al. |
| 2005/0154136 A1 | 7/2005 | Dharia et al. |
| 2005/0155690 A1 | 7/2005 | Park |
| 2005/0164127 A1 | 7/2005 | Reid et al. |
| 2005/0167928 A1 | 8/2005 | Park et al. |
| 2005/0272872 A1 | 12/2005 | Park |
| 2005/0275565 A1 | 12/2005 | Nachtigal et al. |
| 2006/0000801 A1 | 1/2006 | Park |
| 2006/0003126 A1 | 1/2006 | Park |
| 2006/0003127 A1 | 1/2006 | Park et al. |
| 2006/0004117 A1 | 1/2006 | Park |
| 2006/0004126 A1 | 1/2006 | Park et al. |
| 2006/0004142 A1 | 1/2006 | Park |
| 2006/0004147 A1 | 1/2006 | Park et al. |
| 2006/0099368 A1 | 5/2006 | Park |
| 2006/0100333 A1 | 5/2006 | Park |
| 2006/0100368 A1 | 5/2006 | Park |
| 2006/0142491 A1 | 6/2006 | Park |
| 2006/0142492 A1 | 6/2006 | Park |
| 2006/0290070 A1 | 12/2006 | Park |
| 2007/0004862 A1 | 1/2007 | Park et al. |
| 2007/0004865 A1 | 1/2007 | Park |
| 2007/0036980 A1 | 2/2007 | Park |
| 2007/0055020 A1 | 3/2007 | Park |
| 2007/0060707 A1 | 3/2007 | Park et al. |
| 2007/0092731 A1 | 4/2007 | Park |
| 2007/0093605 A1 * | 4/2007 | Adur ........................ 525/242 |
| 2007/0095790 A1 | 5/2007 | Park |
| 2007/0142555 A1 | 6/2007 | Park et al. |
| 2007/0167574 A1 | 7/2007 | Park |
| 2007/0210530 A1 | 9/2007 | Park et al. |
| 2007/0213423 A1 | 9/2007 | Park |
| 2008/0303184 A1 | 12/2008 | Park |
| 2009/0022922 A1 | 1/2009 | Park |
| 2009/0105385 A1 | 4/2009 | Park |
| 2009/0203846 A1 | 8/2009 | Park et al. |
| 2009/0303184 A1 | 12/2009 | Tao et al. |

FOREIGN PATENT DOCUMENTS

| | | |
|---|---|---|
| CA | 2509675 | 12/2005 |
| CA | 2509703 | 12/2005 |
| EP | 0509373 | 10/1992 |
| EP | 1254936 | 11/2002 |
| EP | 1655739 | 5/2006 |
| JP | 61168649 | 7/1986 |
| WO | WO96/07695 | 3/1996 |
| WO | WO 98/31541 | 7/1998 |
| WO | WO01/02508 | 1/2001 |
| WO | WO 02/42372 | 5/2002 |
| WO | WO2005/012410 | 2/2005 |

OTHER PUBLICATIONS

Electron-Beam Processing of Plastics: An Alternative to Chemical Additives, E-BEAM Services, Inc., Presented at 58th SPE Annual Technology Conf May 11, 2000.

Kenji Nagai Figure from "Technical Issues and Counter Measures for FKM", Industrial Material, pp. 62-65, vol. 44, No. 3 Mar. 1996.

Worm, A. and Grootaert, W. "Fluorocarbon Elastomers," Encyclopedia of Polymer Science and Technology, vol. 2. Article Online Posting Date: Oct. 22, 2001.

MatWeb, Online Material Data Sheet: Dyneon Fluorel FT-2350 Fluoroelastomer. Copyright 1996-2007 by Automation Creations, Inc. (Downloaded Jun. 13, 2007).

MatWeb, Online Material Data Sheet: Dyneon Fluorel FT-5830Q Fluoroelastomer. Copyright 1996-2007 by Automation Creations, Inc. (Downloaded Jun. 13, 2007).

* cited by examiner

ROBUST MAGNETIZABLE ELASTOMERIC THERMOPLASTIC BLENDS

INTRODUCTION

The present disclosure relates to a polymeric binder of thermoplastic and elastomer for preferred use in making segmentally magnetizable materials, and to the application of the magnetizable materials in making speed sensor targets (encoder targets).

Rotational speed sensors (frequently used in automotive applications) have generally been based on principles of magnetic field sensing. Targets for speed sensors, such as magnetic encoder targets, generally have a magnetizable substance, such as an iron oxide material, bonded to a structural support ring with alternating magnetic poles established via magnetic remanence around the circumference of the magnetizable substance in the encoder, providing thereby alternating segments of differentiated magnetic field strength within the material of the encoder target. Thermoset elastomers have been used in magnetizable substances as ferrite powder carriers to provide adequate mechanical, dynamic and thermal behavior needed in press-fit conditions common in automotive wheel-speed applications. However, thermoset elastomer-based magnetic compounds are difficult to blend and form in production-sized rubber compounding equipment due to their high density from the loading level of ferrite. In this regard, production batch volumes weigh two to four times more than standard rubber compound batches, and handling of the material is thereby difficult. Processing of thermoset elastomer-based magnetic compounds into a fully cured article also requires relatively expensive equipment, substantial time, and substantial labor. In this regard, for instance, nitrile butyl rubber encoders must first be formulated, molded, and cured. The molded part, after curing, is then appropriately grooved before the grooved encoder can be subsequently bonded, attached, and/or fastened into its target wheel assembly.

Thermoplastic elastomers have been used as a potential replacement for thermoset rubbers in magnetizable compounds for encoder targets; and admixtures of thermoplastic polymer, elastomeric polymer, and magnetizable powder have been made by dispersing hard magnetic material in a blend of an elastomeric material and a thermoplastic material (prior to the onset of cure of the elastomeric material), and then curing the blend (utilizing a curing agent) in a dynamic vulcanization curing system.

Blends of elastomers, thermoplastic, and hydrophobic material in target encoders using radiation curing (especially electron beam curing) of elastomeric thermoplastic magnetizable admixture encoder formulations have also been shown to be beneficial to the mechanical and water resistance properties of a derived encoder target.

Chemical agent and thermal stress robustness in magnetizable materials that provide differentiated magnetic field strengths continues, however, to be challenged by needs related to brittleness, elasticity, heat resistance, and processability in manufacture. Thus, it is desirable to have a magnetizable material that is readily fabricated into a magnetic encoder target that is robust in use to chemical attack and to thermal stress while maintaining other desired properties in use of the magnetic encoder.

SUMMARY

The present technology provides compositions comprising uncured elastomer dispersed in thermoplastic where the compositions are radiation curable to provide cured polymer having a dynamic mechanical thermal analyzer tangent delta value (ASTM E 1640-94) not greater than 0.1 at a temperature not less than the liquefaction supra point temperature of the thermoplastic. In one aspect, the technology provides a magnetizable material comprising magnetizable particulate (such as, without limitation, ferrite, at least one rare earth metal, or a combination of these materials) dispersed throughout polymeric binder according to the above composition.

In various embodiments, the present technology provides a magnetizable composition, comprising:
(a) magnetizable particulate dispersed throughout cured polymeric binder; where
(b) a first magnetic field in a first portion in a block of the composition is differentiated from a second magnetic field in a second portion of the block by not less than 200 Gauss when measured across an air detection gap of about 1 mm where the block has a length of about 1 centimeter, a width of about 1 centimeter, and a thickness of about 50 millimeters;
(c) the cured polymeric binder is radiation cured from polymeric binder of uncured elastomer dispersed in thermoplastic so that the cured polymeric binder comprises elastomer dispersed in the thermoplastic; and
(d) the polymeric binder, if cured by radiation without dispersing of any of the magnetizable particulate therein, would have a dynamic mechanical thermal analyzer tangent delta value not greater than 0.1 at a temperature not less than the liquefaction supra point temperature of the thermoplastic.

In various embodiments, the compositions are essentially devoid of curing agent for the uncured elastomer.

In various embodiments, the thermoplastic is selected from the group consisting of thermoplastic elastomer, thermoplastic vulcanizate, or a combination of these materials. The thermoplastic comprises from about 1 weight percent to about 99 weight percent of the composition when the thermoplastic essentially comprises thermoplastic elastomer. Thermoplastic vulcanizate comprises from about 1 weight percent to about 50 weight percent of the composition when the thermoplastic essentially comprises thermoplastic vulcanizate.

In various embodiments, the magnetizable particulate comprises at least one element selected from the group consisting of iron, earth metals, or combinations of these materials. The magnetizable particulate preferably comprises from about 70 weight percent to about 95 weight percent of the composition when the magnetizable particulate comprises a ferrite material. The magnetizable particulate preferably comprises from about 15 weight percent to about 50 weight percent of the composition when the magnetizable particulate comprises a rare earth metal material. In various embodiments, the magnetizable particulate further comprises particles where each of essentially all of the particles is independently not greater than 1000 microns minimum essential diameter, and each of at least 50% of the particles is independently not greater than 100 microns minimum essential diameter.

In further aspects in various embodiments, the uncured elastomer comprises particles, and each of essentially all of the uncured elastomer particles is independently not greater than 100 microns minimum essential diameter.

The present technology provides an encoder target (such as, without limitation, a radial encoder target, or an axial encoder target) and/or an encoder target precursor made of one of the above compositional embodiments. In one embodiment of this, the invention provides an encoder target precursor comprising formed material of an uncured embodiment of one of the above compositions where the polymeric binder of the encoder target precursor, when independently prepared by dispersing the uncured elastomer into the thermoplastic without dispersing of any of the magnetizable particulate and then by curing the dispersed uncured elastomer with radiation, has a dynamic mechanical thermal analyzer tangent delta value not greater than 0.1 at a temperature not less than the liquefaction supra point temperature of the thermoplastic. In various embodiments, the invention provides an encoder target after radiation curing of the encoder target precursor and after segmental magnetization of the cured encoder target precursor to provide (a) at least one first magnetized portion in the encoder target where the first magnetized portion has a first magnetic field strength; and (b) at least one second portion in the encoder target where the second portion has a second magnetic field strength differentiated from the first magnetic field strength by not less than about 200 Gauss when measured across an air detection gap of about 1 mm.

In yet another aspect in various embodiments, the encoder target or encoder target precursor is a layer in a multilayer composite. In some embodiments of these, the encoder target (or encoder target precursor layer) is cohered to an elastic layer, and the elastic layer is cohered to a rigid layer.

The technology provides methods for making any of the above compositional or encoder target embodiments described above. One such method for making a pre-cured composition, comprises:

(a) dispersing uncured elastomer and magnetizable particulate into thermoplastic to prepare a magnetizable blend of the magnetizable particulate distributed throughout a polymeric binder of the uncured elastomer distributed in the thermoplastic; where (b) the composition is segmentally magnetizable such that a first magnetic field in a first portion in a block of said magnetizable composition is differentiated from a second magnetic field in a second portion of said block by not less than 200 Gauss when measured across an air detection gap of about 1 mm wherein said block has a length of about 1 centimeter, a width of about 1 centimeter, and a thickness of about 50 millimeters; and (c) the polymeric binder, if cured by radiation without dispersing of any of the magnetizable particulate therein would have a dynamic mechanical thermal analyzer tangent delta value not greater than 0.1 at a temperature not less than the liquefaction supra point temperature of the thermoplastic.

In various embodiments, methods further comprise curing the uncured elastomer with radiation. In one embodiment, the radiation is electron beam radiation. In a further aspect in various embodiments the curing uses electron beam radiation from about 0.1 MeRAD to about 100 MeRAD. In yet a further aspect in various embodiments, the curing uses electron beam radiation from about 10 MeRAD to about 40 MeRAD.

The invention also provides a method for making an encoder target precursor of any of the above compositional embodiments described above, comprising:

(a) dispersing uncured elastomer and magnetizable particulate into thermoplastic to prepare a magnetizable blend of the magnetizable particulate distributed throughout a polymeric binder of the uncured elastomer distributed in the thermoplastic; and (b) forming the magnetizable blend into the encoder target precursor; wherein (c) the polymeric binder, if cured by radiation without dispersing of any of the magnetizable particulate therein would have a dynamic mechanical thermal analyzer tangent delta value not greater than 0.1 at a temperature not less than the liquefaction supra point temperature of the thermoplastic.

The technology further provides the additional steps of:

(d) curing the encoder target precursor with radiation to provide a cured encoder target precursor;

(e) magnetizing at least one first magnetized portion in the cured encoder target precursor such the first magnetized portion has a first magnetic field strength as a remanence; and (f) providing at least one second portion in the cured encoder target precursor, the second portion having a second magnetic field strength differentiated from the first magnetic field strength by not less than about 200 Gauss when measured across an air detection gap of about 1 mm to provide the encoder target.

In various embodiments, the curing is effected with electron beam radiation as described above.

BRIEF DESCRIPTION OF THE DRAWINGS

The present disclosure will become more fully understood from the detailed description and the accompanying drawings of FIGS. 1 to 14. The drawings described herein are for illustration purposes only and are not intended to limit the scope of the present disclosure in any way.

Figure 1:
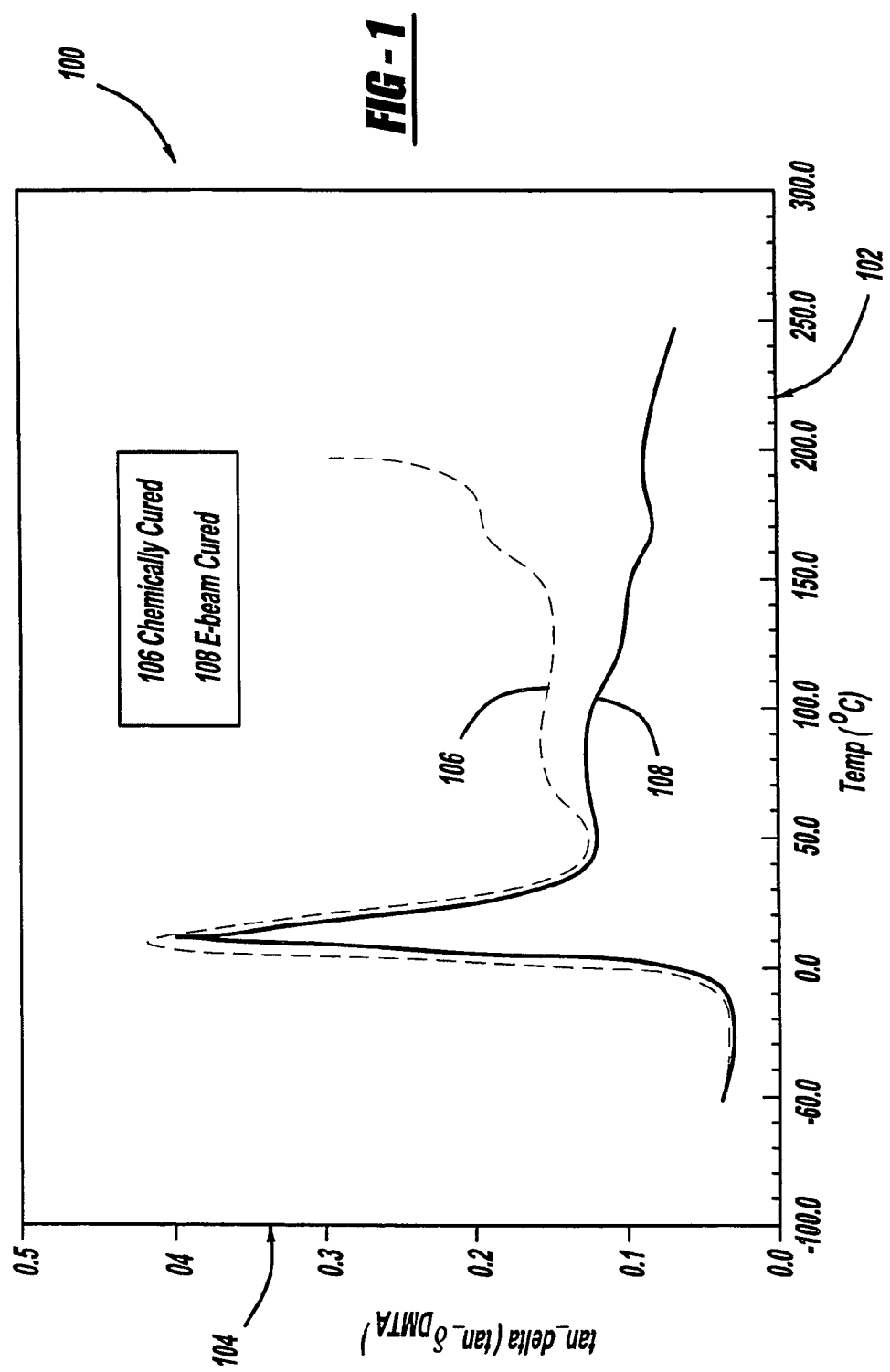
FIG. 1 presents a graph of $\tan\_\delta_{DMTA}$ measurements as a function of temperature for polymeric binder embodiments derived from curing dispersed uncured elastomer in thermoplastic.

It should be noted that the figures set forth herein are intended to exemplify the general characteristics of an apparatus, materials, and methods among those of this description, for the purpose of the description of such embodiments herein. The figures may not precisely reflect the characteristics of any given embodiment, and are not necessarily intended to define or limit specific embodiments within the scope of this description.

DESCRIPTION

The following description is merely exemplary in nature and is not intended to limit the present disclosure, application, or uses. It should be understood that throughout the drawings, corresponding reference numerals indicate like or corresponding parts and features.

The following definitions and non-limiting guidelines must be considered in reviewing the disclosure set forth herein.

The headings (such as "Introduction" and "Summary") and sub-headings used herein are intended only for general organization of topics within this description, and are not intended to limit this description or any aspect thereof. In particular, subject matter disclosed in the "Introduction" may include aspects of technology within the scope of this description, and may not constitute a recitation of prior art. Subject matter disclosed in the "Summary" is not an exhaustive or complete disclosure of the entire scope of this description or any embodiments thereof.

The citation of references herein does not constitute an admission that those references are prior art or have any relevance to the patentability of this description disclosed herein. All references cited in the Description section of this specification are hereby incorporated by reference in their entirety.

The description and specific examples, while indicating embodiments of this description, are intended for purposes of illustration only and are not intended to limit the scope of this description. Moreover, recitation of multiple embodiments having stated features is not intended to exclude other embodiments having additional features, or other embodiments incorporating different combinations of the stated of features.

As used herein, the words "preferred" and "preferably" refer to embodiments of this description that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of this description.

As used herein, the word "include," and its variants, is intended to be non-limiting, such that recitation of items in a list is not to the exclusion of other like items that may also be useful in the materials, compositions, devices, and methods of this description.

Most items of manufacture represent an intersection of considerations in both mechanical design and in materials design. In this regard, improvements in materials frequently are intertwined with improvements in mechanical design. The embodiments describe compounds, ingredients (functional constituents in a mixture where a constituent, prior to being mixed into the mixture, can contain more than one chemical compound), compositions, materials, assemblies, and manufactured items that enable improvements in polymeric binders of thermoplastic and elastomer and derived magnetizable materials to be fully exploited.

The examples and other embodiments described herein are exemplary and not intended to be limiting in describing the full scope of compositions, materials, assemblies, methods, and manufactured items methods of this description. Equivalent changes, modifications and variations of specific embodiments, materials, compositions and methods may be made within the scope of the present disclosure, with substantially similar results.

Thermoplastic elastomers are a potential replacement for thermoset rubbers in magnetizable compounds for encoders, and certain of these materials are described in U.S. patent application Publication No. 2004/0183702 (Nachtigal et al.) entitled "Magnetizable Thermoplastic Elastomers" filed Jan. 20, 2004. In defining a basis for use of thermoplastic elastomers in target encoders, U.S. patent application Publication No. 2004/0183702 reviews the making of magnetizable compositions by dispersing hard magnetic material in a blend of an elastomeric material and a thermoplastic material prior to the onset of cure of the elastomeric material, and then curing the blend with a dynamic vulcanization curing system through use of a curing agent.

Further descriptions of using electron beam radiation to cure a magnetizable compound for encoders are described in U.S. patent application Publication No. 2006/0124889 (Park et al.) entitled "Water Resistant Encoding Material" filed Dec. 14, 2004. In this regard, radiation curing (especially electron beam curing) of elastomeric thermoplastic magnetizable admixture encoder formulations is beneficial to the mechanical and water resistance properties of a derived encoder. The reason for this is that, while the melting point of crystals in a cross-linked thermoplastic is sustained in all crystalline portions of the thermoplastic, the dynamic modulus of cross-linked thermoplastic will be higher than that of comparable non-crosslinked thermoplastic due to crosslinkage between thermoplastic molecules in the amorphous phase of the thermoplastic. Further details in this regard are described in U.S. patent application Publication No. 2006/0004142 (Park) entitled "Electron Beam Inter-Curing of Plastic and Elastomer Blends" filed Jun. 30, 2004.

The invention provides polymeric binder blends and materials cured from the polymeric binder blends where magnetizable particulate is dispersed throughout a polymeric binder of particles of elastomer dispersed in thermoplastic. Prior to blending with magnetizable particulate to make a magnetizable material, the polymeric binder embodiment, if independently (without being intermixed, interblended, admixed, or blended with the magnetizable material) radiation cured (preferably with electron beam radiation), has a dynamic mechanical thermal analyzer tangent delta value (ASTM E 1640-94) not greater than 0.1 at a temperature not less than the liquefaction supra point temperature of the thermoplastic. The dynamic mechanical thermal analyzer tangent delta value (also denoted herein as the $\tan\_\delta_{DMTA}$ value, tangent delta value, tan_delta, or $\tan\_\delta_{DMTA}$) is a measure convolving viscosity property status and elasticity property status in the blended embodiments; in this regard, a $\tan\_\delta_{DMTA}$ value, when measured at or above the liquefaction supra point (equivalent to the melting point in crystalline thermoplastics) for thermoplastic that is further highly loaded (either via direct blending or by virtue of molecular design) with dispersed elastomer, of less than or equal to 0.1 provides a material for achieving excellent robustness in performance while simultaneously affording both good processability and also a polymeric binder that can sufficiently disperse magnetic particulate for achieving differentiated magnetized fields of sufficient strength for an encoding target having segmentally-differentiated magnetic pole pairs.

In overview of one exemplary material embodiment, thermoplastic elastomer is admixed with uncured elastomer (elastomer gum, elastomeric oligomer, liquid elastomer, or a combination thereof) so that the uncured elastomer is dispersed (as a first dispersed phase) into the thermoplastic elastomer to provide, thereby, a blended polymeric binder. Finely particulated magnetizable particulate is then blended into the polymeric binder so that the magnetizable particulate is dispersed (as a second dispersed phase) in the thermoplastic and is also dispersed in the uncured elastomer. The polymeric binder blend (admixture) and also the magnetizable material bend (admixture) are both blended without any curing agent for the uncured elastomer, however. Therefore, except for trace amounts resulting from happenstance, there is essentially no elastomeric curing agent respective to the uncured elastomer in the magnetizable blend and the magnetizable blend is therefore essentially devoid of elastomeric curing agent respective to the uncured elastomer. After the blending has been fully achieved, the uncured elastomer (the dispersed elastomer gum) in the blend is cured with use of irradiation, preferably electron-beam radiation.

The essential absence of curing agent in a blend where magnetic particulate is also blended into the suspended elastomeric phase provides a route to achieving a high magnetic particulate loading; the ability to measure a $\tan\_\delta_{DMTA}$ value less than or equal to 0.1 when the "neat" polymeric binder (the polymeric binder of thermoplastic and uncured elastomer prior to the addition of magnetic particulate or other fillers) is further cured with radiation (preferably electron beam radiation as further described herein) is a key indicator for polymeric binder formulation that will provide a high degree of magnetic particulate loading along with a thermally and chemically robust cured magnetizable material after magnetizable particulate is interblended into the polymeric binder and the entire magnetizable material is then formed and cured.

In overview of another exemplary material embodiment, thermoplastic vulcanizate is admixed with uncured elastomer (elastomer gum, elastomeric oligomer, liquid elastomer, or a combination thereof) so that the uncured elastomer is dispersed (as a first dispersed phase) into the thermoplastic of the thermoplastic vulcanizate to a particle size of not greater than 100 microns to provide a polymeric binder. Finely particulated magnetizable particulate is then blended into the polymeric binder so that the magnetizable particulate is dispersed (as a second dispersed phase) in the thermoplastic and is also dispersed in the uncured elastomer. The blend (admixture) is blended without addition of any curing agent for the uncured elastomer, however. The vulcanizate of the thermoplastic vulcanizate also provides an effective additional (third) dispersed phase of elastomer having independent particle sizes in the range of 10 microns in the thermoplastic of the thermoplastic vulcanizate, but it is to be noted that no magnetic particulate can interblend into the dispersed elastomer phase since that phase has been vulcanized. Therefore, after curing, the magnetizable blend will have magnetizable particulate in the elastomer cured by radiation from the uncured elastomer, but the elastomer of the original thermoplastic vulcanizate component will continue to exist as dispersed elastomer particles that are devoid of magnetic particulate. After blending has been fully achieved, the uncured elastomer (the dispersed elastomer gum) is cured with use of radiation, preferably electron-beam radiation. While some curing agent from the thermoplastic vulcanizate is residually present in the blend, the relatively small amount of curing agent in the blend (where magnetic particulate is also blended into the suspended elastomeric phase along with suspended vulcanizate of very low particle size) provides another route to achieving a high magnetic particulate loading commensurate with use of a polymeric binder having an independently defined $\tan\_\delta_{DMTA}$ value less than or equal to 0.1 under the previously described criteria.

As should be appreciated from the foregoing, other material embodiments are enabled (with blends of thermoplastic elastomer, thermoplastic vulcanizate, uncured elastomer, and finely ground magnetic particulate) where no curing agent is added for the uncured elastomer and where the uncured elastomer is cured into elastomer with radiation. In each successful blend, the materials are blended to achieve acceptable magnetic properties for an encoder target using a polymeric binder having a $\tan\_\delta_{DMTA}$ value less than or equal to 0.1 if independently cured without the magnetic particulate or other filler being intermixed.

In greater detail, the thermoplastic and uncured elastomer are proportioned to provide a polymeric binder composition having a $\tan\_\delta_{DMTA}$ value less than or equal to 0.1 if cured with radiation (preferably electron beam radiation) when devoid of magnetic particulate and/or filler. After the polymeric binder has been made, but prior to the radiation curing operation, a sufficient quantity of magnetic particulate is blended (admixed) into the polymeric binder so that a first magnetic field in a first portion in a cured 1 cm×1 cm×50 mm block of the resulting magnetizable composition is differentiated from a second magnetic field in a second portion of the block by not less than about 200 Gauss when measured across an air detection gap of about 1 mm. This is achieved in a an encoder target (or other formed item) by magnetizing alternate portions in the encoder target to a first magnetic field strength as a remenance while having adjacent portions in the encoder target at the second magnetic field strength (the second magnetic field strength is achieved in many embodiments by not magnetizing the portions that are to have the second magnetic field strength and providing thereby a field strength of essentially zero in those portions). In many embodiments, a series of these first and second portions (together providing a magnetic pole pair) are sequentially generated so that, in use, an alternating magnetic field passes by a sensor as the target either physically moves past the sensor or as a the sensor moves across the target. In the most basic embodiment, only one first magnetic field strength portion is provided along with only one portion having the second magnetic field strength.

The $\tan\_\delta_{DMTA}$ value is determined according to ASTM E 1640-94. The 1 cm×1 cm×50 mm block is representative of the loading needed in an encoder target for an encoder application. Respective to the amount of magnetizable particulate, it is to be appreciated that excessive particulate can either frustrate elongation by rendering cured magnetizable polymer derived from the admixture too brittle or, in some cases where an essentially pure metal element is suspended (for instance, iron in the form of uncompounded ferrite), frustrate selective magnetization of separate portions of the cured 1 cm×1 cm×50 mm block into differentiated magnetic remanence (segmental magnetization) by creating an effective continuum of magnetizable material where the individual particles cannot be independently magnetized. However, sufficient particulate must be admixed so that the cured polymer will provide sufficient magnetic remenance, after a magnetizing field has been applied to a portion of the cured block, so that a reasonable sensor (positioned within a reasonable distance of the cured portion of the encoder having the remenance) can respond to the higher remenance when the (first) magnetized portion passes by the sensor and also respond to the lower remenance (or lack of magnetic field in one embodiment) when the (second) portion passes by. A differentiation between the (remenance) fields of the first and second portions of about 200 Gauss or greater as measured across an air detection gap of about 1 mm provides such utility.

In various material embodiments, by blending certain amounts of desired ingredients, these thermoplastic materials are melt-processed in standard processing equipment, such as injection molders, plastic extruders, and blow molders, while maintaining material properties needed for use in magnetic encoders. Importantly, formulating with polymeric binder that, when independently cured achieves the tan_$\delta_{DMTA}$ value of less than 0.1 after curing of the polymeric binder, appears to enable pultrusion of further admixed pre-cured magnetizable blends into profiled encoder extrudate that can then be either cured and segmented (or, alternatively, segmented and cured) to provide, in one embodiment, an encoder target (after removal of the pultrusion core component from the extrudate segment) or, in an alternative embodiment, a encoder target multilayer composite (where the pultrusion core component is adhered, optionally with benefit of an adhesive layer, to the encoder target as a layer in the multilayer encoder target). In one embodiment, a encoder target multilayer composite provides a pultrusion core component that is adhered, optionally with benefit of at least one adhesive layer, to a layer of elastomer that resides between the core and the encoder target layer made of the magnetizable material; such an embodiment provides yet further robustness to mechanical and/or vibration shock as the elastomeric layer provides a cushion between the more rigid inner layer and magnetizable layer. In various embodiment, the above material and/or composite embodiments are used in magnetic encoder target multilayer composites for encoders employed under the extreme environmental conditions experienced by automotive vehicles.

Respective to the continuous and distributed phases in the admixture and/or blend embodiments, elastomeric thermoplastics (thermoplastic elastomers of either TPE or TPV materials) are a class of polymers in which the end use properties of elastomers and/or vulcanized elastomers are combined with the processing advantages of thermoplastics. These materials are convenient for use with conventional processing techniques, such as milling, injection molding, extrusion, blow molding, and vacuum forming—allowing the production of useful articles having elastomeric properties. In embodiments where uncured elastomer is blended into a non-elastomeric thermoplastic, the blending and subsequent curing effectively create a thermoplastic vulcanizate; the pro-cured embodiments of these material embodiments are convenient for use with conventional processing techniques, such as milling, injection molding, extrusion, blow molding, and vacuum forming—allowing the production of useful articles having elastomeric properties after curing. The thermoplastic material and the cured elastomeric material are present in the magnetizable composition embodiments at levels sufficient to provide the necessary material and strength and durability for the application, while retaining good processability on standard plastics equipment. The hard magnetic particulate distributes during admixing into both polymers for the polymeric blend in embodiments where (a) a thermoplastic continuum phase is provided from either a thermoplastic or thermoplastic elastomer, (b) an uncured elastomer phase is also provided in the admixture (providing thereby, with the thermoplastic continuum phase, two polymeric phases), and one hard particulate phase dispersed in both polymeric phases (it is to be noted that magnetic particulate disperses into the dispersed uncured elastomer since that elastomer phase is liquid during the admixing so that the uncured elastomer has some aspects of a phase within a phase). The distributing provides an admixed material having at least three phases. In alternative embodiments where the hard magnetic particulate distributes during admixing into a blend of thermoplastic vulcanizate and uncured elastomer, an overall admixture of at least four phases is provided with a first phase of thermoplastic, a second phase of distributed vulcanizate that is devoid of dispersed hard magnetic particulate (magnetic particulate cannot disperse into the dispersed vulcanizate of the thermoplastic vulcanizate since that vulcanizate phase is already cured and cannot be liquefied during the admixing), a third phase of distributed elastomer that substantially contains dispersed hard magnetic particulate (magnetic particulate disperses into the dispersed uncured elastomer since that elastomeric phase is liquid during the admixing so that the uncured elastomer has some aspects of a phase within a phase), and one hard particulate phase. Additional phases in both generic embodiments are optionally provided from other possible additives and fillers that are interblended into the overall polymeric blend of uncured elastomer and thermoplastic.

Preferably, the multiphase embodiment compositions are heavily loaded with a hard magnetic material type of magnetic powder to provide compositions for forming into encoder targets for rotational sensors that operate on magnetic principles. In particular, shaped articles produced from the magnetizable composition embodiments are magnetized according to known procedures to produce alternating opposite magnetic poles along a surface of the shaped article. The magnetizable particulate is preferably sized such that at least one diameter (the minimum diameter for each independent particle) for each independent particle is not greater than 1000 microns and so that a reasonable proportion of the individual particles have at least one diameter for each independent particle is not greater than 80 microns. Respective to a reasonable proportion (preferably at least 50 percent by count of the particles, more preferably at least 60 percent by count of the particles, and still more preferably at least 70 percent by count of the particles) of the individual particles preferably having at least one diameter for each independent particle is not greater than 100 microns, it is desirable for the blending to achieve dispersion of some of the magnetizable particulate within the uncured elastomer particles. Since the uncured elastomer is generally blended so that the independent uncured elastomer particles have a particle size not greater than 100 microns, some of the magnetic particles need to be smaller so that they can be reasonably surrounded by elastomer in the finally cured material.

The minimum diameter in an essentially spherical particle embodiment is effectively the diameter of the particle, since all diameters are effectively the same for an essentially spherical particle; in an elongated fibril particle embodiment, where an (either curvilinear or essentially linear) axis is effectively defined along the length of the fibril particle, the minimum diameter is measured at the narrowest cross-sectional plane perpendicular to the axis. In an essentially oviform particle embodiment where an ellipsoid major axis is effectively defined through the maximum transverse dimension of the oviform particle, the minimum diameter is measured effectively at the minor axis across a cross-sectional plane perpendicular to the major axis at essentially the midpoint of the major axis.

In most preferred embodiments, the thermoplastic polymeric material used in the embodiments is a thermoplastic elastomer (TPE). As previously noted, thermoplastic elastomers have some physical properties of rubber, such as softness, flexibility and resilience, but are processed in a similar manner to thermoplastics. A transition from a melt to a solid rubber-like composition occurs fairly rapidly upon cooling. The transition is readily reversible upon heating.

Even as the elastomeric thermoplastic or thermoplastic provides a continuous phase in the admixture respective to the dispersed phases of magnetizable particulate and magnetizable particulate containing elastomer, it is to be appreciated (as previously noted) that thermoplastic elastomers and thermoplastics themselves in very microscopic detail have a multi-phase aspect. In thermoplastic elastomers, elastomeric monomer/oligomer and thermoplastic monomer/oligomer are generally intimately mixed at the molecular level and then jointly copolymerized in making thermoplastic elastomers, thermoplastic vulcanizates themselves have a multi-phase structure as a polymeric admixture of distinguished polymeric portions of vulcanizate suspended in thermoplastic.

The finished material embodiments therefore can be viewed in microscopic detail as blends of phases having nested blended phases.

In a preferred embodiment, one of the magnetizable composition embodiments is incorporated into an encoder target for a magnetic encoder, such as used in the automotive and other industries as targets for a magnetic wheel speed sensor. Encoder targets are produced in one embodiment where the magnetizable composition is over-molded onto a metal case that has been pretreated with adhesive. The over-molding process is accomplished in one embodiment by compression molding; in another embodiment, over-molding is accomplished with an injection molding process. In yet another embodiment, the encoder is made from one of the magnetizable composition embodiments in a bi-material molding process, where a thermoplastic (compositionally differentiated from the elastomeric thermoplastic of the magnetizable admixture) is molded as a structural substrate for the magnetizable composition embodiments. In yet another embodiment, an extrusion of profiled extrudate is formed of a pre-cured magnetizable composition embodiment, and the profiled extrudate is either segmented and then cured or cured and then segmented to provide the finished encoder target. In some extrusion embodiments, a pultrusion of profiled extrudate forms a precured magnetizable composition embodiment, and the profiled extrudate is either segmented and then cured or cured and then segmented to provide the finished encoder target. In yet other embodiments of any of the above, a composite structure is made where one of the magnetizable composition embodiments (in either procured or cured form) provides a layer in the composite. In yet other composite embodiments, a composite structure is made where one of the magnetizable composition embodiments (in either procured or cured form) provides a layer in the composite that is cohered to an elastic layer what is also cohered to a rigid layer. In this last set of embodiments, the elastic layer functions to further "cushion" the magnetizable blend layer against fracture from vibration and/or mechanical shock.

An example of an embodiment application for which the material compositional embodiments is used is a magnetic encoder target for a wheel speed measuring system. Such a wheel speed measuring system has particular application in automobiles or in other systems having a need for measuring the speeds of components. In one embodiment, such an encoder target is made with a previously described admixture over-molded onto a metal case pretreated with adhesive. Another example approach for making an encoder for the wheel is, as previously generally noted, to mold the admixture in a bi-material molding process, where a thermoplastic (compositionally differentiated from the elastomeric thermoplastic of the magnetizable admixture) is molded as the structural substrate for the magnetizable TPE substance.

Turning now to greater detail in the materials of the embodiments, carbon-macromolecule-based polymeric materials (polymers) are usefully defined as falling into one of three traditionally separate generic primary categories: thermoset materials (one type of plastic), thermoplastic materials (a second type of plastic), and elastomeric (or rubber-like) materials (elastomeric materials are not generally referenced as being "plastic" insofar as elastomers usually do not provide the property of a relatively inflexible solid "finished" state). One important measurable consideration with respect to these three categories is the concept of a melting point (MP)—a point where a solid phase and a liquid phase of a material co-exist. A second important measurable consideration with respect to these three categories is the concept of a glass transition temperature ($T_g$). In this regard, a thermoset material essentially cannot be melted or liquefied after having been "set" or "cured" or "cross-linked". Precursor component(s) to the thermoset plastic material are usually shaped in molten (or essentially liquid) form, but, once the setting process has executed, a melting point essentially does not exist for the cured material. A thermoplastic plastic material, in contrast, hardens into solid form, retains a melting point (or, for a few thermoplastic materials as further discussed below, a glass transition temperature of greater than 0° Celsius) essentially indefinitely, and re-melts (albeit in some cases with a certain amount of degradation in general polymeric quality) after having been formed. An elastomeric (or rubber-like) material does not have a melting point; rather, the elastomer has a glass transition temperature of not greater than 0° Celsius where the polymeric material demonstrates an ability to liquefy and usefully flow, but without co-existence of a solid phase and a liquid phase at a melting point.

In further consideration of melting points and glass transition temperatures, most thermoplastic materials have a melting (solidification) point associated with the presence of crystals in the thermoplastic polymer, but some thermoplastics (such as, without limitation, atactic polystyrene) are considered to be substantially amorphous with a characteristic glass transition temperature rather than a melting point. In this regard and as detailed above, elastomers and amorphous thermoplastics are differentiated by the ranges of their glass transition temperatures, with the glass transition temperature for an essentially amorphous thermoplastic being greater than 0° Celsius and the glass transition temperature for an elastomer being not greater than 0° Celsius.

In detailed consideration of microscopic aspects of melting points and glass transition temperatures, a large set of individual polymer molecules collectively form polymer materials or polymer masses having internal morphologies with independent aspects that emerge under microscopic examination of the particular polymeric material (polymer mass). In this regard, the term "polymer" in colloquial usage can reference either (a) a particular molecule derived from the linking together of a plurality of at least one monomer unit type, (b) a collection of such molecules in a polymeric material (polymer mass) as a region of the material, or (c) the polymer material as a collected and holistic polymer mass. Concepts such as melting point and glass transition temperature have commensurately differentiated relevance. In this regard, a melting point in one polymer material embodiment can reference (in one context) a generalized energy state in a polymer material where the entire mass of material becomes effectively liquid. However, the term of "melting point" for a micro-region of that polymer material embodiment can also reference (in a second context) localized behavior and status where the regional energy becomes too high to sustain crystalline morphology in the independent polymer molecules in the region, even though the overall macroscopic status of the material is still effectively solid. In this regard, a melting point for an isolated crystallizable polymeric macromolecule is the energy state where it transitions between a crystalline morphology and a morphology which does not evidence the ordered structural aspects of a crystal; a melting point in a large group of polymeric macromolecules (a polymeric material) references a temperature (and implied pressure—usually standard pressure) such that a solid material exists at a temperature below the melting point for the group and an effectively liquid material exists at a temperature above the melting point for the group.

As indicated in the above, when a particular polymer material is microscopically examined, local morphological aspects of the polymer material emerge that redefine the polymeric material into sets of dispersed morphological regions.

A polymeric material exhibiting a bulk melting point usually exhibits morphology having the structural features of polymer crystal particles (or polymeric crystal portions or polymeric crystal regions) dispersed in an amorphous polymer continuum (providing polymeric amorphous regions bordering small sets of polymer crystal portions—where one such amorphous region is somewhat akin to a small sea or sound inside of a group of islands, such as the New Georgia Sound within the Solomon Islands). In microscopic consideration of such a polymeric material, the crystalline regions have affiliated local melting points, and the amorphous regions have affiliated local glass transition temperatures. These regions have cross-sectional dimensions that are rather small: usually in the 5 to 1000 Angstrom ($5 \times 10^{-4}$ to 0.1 micron) range. When such a polymer material progressively undergoes a temperature increase from a fairly rigid solid material (at a temperature below its bulk melting point, below all of its localized melting points, and below all of its localized glass transition temperatures) to a liquid material (at a temperature at or above its bulk melting point), the amorphous regions individually progress through their glass transition temperatures and the polymer crystal regions individually progress through their melting points at different times. This can be observed through use of differential scanning calorimeter (DSC) systems. Usually, the localized glass transition temperatures are lower than the localized melting points. The general process of a solid becoming a liquid is termed liquefaction. Accordingly, in the overall process of the polymer material undergoing a temperature increase from the fairly rigid solid material of intermixed crystalline regions and non-flowable amorphous regions (at a temperature below all of the regionally localized melting points and all of the regionally localized glass transition temperatures) to the liquid material, the liquefaction occurs between a liquefaction range sub-point temperature and a liquefaction range supra-point temperature (liquefaction supra point temperature). In this regard, the liquefaction range sub-point temperature (liquefaction sub-point temperature) for a polymer mass or polymer material is defined herein as that temperature where any amorphous region of a polymer melt containing the amorphous region demonstrates liquefaction via measured micro-movement in the phase as determined through differential scanning calorimetry, and the liquefaction range supra-point temperature for a polymer mass or polymer material is defined herein as that temperature where the entire polymer mass or polymer material (all regions as previously existent in the solid or partially liquefied polymer material) demonstrates liquefaction as determined through differential scanning calorimetry.

Turning now to the process of cooling a polymer melt into a polymer material, a polymer material undergoes a temperature decrease from a completely liquid material (a material above its liquefaction range supra-point temperature) to a solid material. During this cooling process, polymer crystals individually form at different times during the solidification process as their respective local regions progress through their respective melting points at different times during the solidification process. Residual amorphous regions also individually progress through their individual regional glass transition temperatures at different times during the cooling and solidification process. Below its glass transition temperature, a material is considered to no longer be liquid and is considered to be a solid insofar as perceptible flow does will not readily occur; it is to be noted, however, that solids, especially polymeric solids or solid micro-regions, may exist either as gelled solids (at temperatures near to the glass transition temperature) or as vitrified solids (at temperatures that are substantially below the glass transition temperature). In this regard, gelled solids are less rigid to deformation than vitrified solids, and gelled solids are potentially more chemically reactive and/or miscible with a contacting solvent than are vitrified solids.

As can be appreciated, many polymeric materials at room temperature have some regions that are crystalline, some regions that are individually amorphous and below the local glass transition temperature, and other regions that are individually amorphous as a local liquid region above the local glass transition temperatures. Such a material frequently has an essentially solid overall character, but an elongated component of such a material is macroscopically flexible to some degree.

Polymer masses are usually not internally deterministic in properties such as molecular weight of independent polymeric macromolecules within the polymer mass; in this regard, a polymer mass is made of polymeric macromolecules that collectively usually provide a distribution of molecular weights. The distribution usually may be characterized by variables relevant to a statistical distribution, so a mean molecular weight and a standard deviation of molecular weight can frequently be characterized for the polymeric mass. Copolymers can also have polymeric macromolecules of differentiated character as monomer/oligomer sequencing from macromolecule to macromolecule is usually somewhat differentiated during macromolecule development. Accordingly, in localized regions, "polymer" that is similar between regions both in chemical composition and amorphous morphology may not necessarily share regional physical-state similarity. In other words, parameters for a statistical distribution of regional polymer properties in a polymer mass may not reflect commensurate parameters for a statistical distribution of polymer properties for the polymer mass as a whole. Microscopically-localized amorphous regions in a polymer mass can therefore be somewhat differentiated in physical behavior near the glass transition temperature due to microscopically-localized differences in chemical and/or physical factors such as (for example) temperature, individual polymeric macromolecule molecular weights, additive concentration, and the like. Near the glass transition temperature for the mass as a whole, each micro-region of polymer therefore could be independently (at any moment in time) vitreous and rigid, gel-like, "slush-like" (like melting snow), or liquid in micro-consistency.

Elastomers are frequently derived from elastomer gums or partially cured elastomer gums through the process of vulcanization (curing, or cross-linking). Such elastomer gum or partially-cured-elastomer-gum forms of elastomer are denoted herein as uncured elastomers. Depending upon the degree of vulcanization in an elastomer, the glass transition temperature may increase to a value that is too high for any practical attempt at liquefaction of the vulcanizate. Vulcanization implements inter-bonding between elastomer macromolecules to provide an elastomeric material more robust against deformation than a material made from the uncured or partially cured elastomers. In this regard, a measure of performance denoted as a "compression set value" is useful in measuring the degree of vulcanization ("curing", "cross-linking") in the elastomeric material. For the initial uncured elastomer form of the elastomer, when the elastomer material is in either a non-vulcanized state or in a state of vulcanization that is clearly preliminary to the final desired vulcanized state, a non-vulcanized compression set value is measured according to ASTM D395 Method B and establishes thereby an initial compressive set value for the particular elastomer that will be vulcanized (cured) to a desired compressive set value. Under extended vulcanization, the elastomer vulcanizes to a point where its compression set value achieves an essentially constant maximum respective to further vulcanization, and, in so doing, thereby defines a material where a fully vulcanized compression set value for the particular elastomer is measurable. In applications, the elastomer is vulcanized to a compression set value useful for the application.

Augmenting the above-mentioned three general primary categories of thermoset plastic materials, thermoplastic plastic materials, and elastomeric materials are two blended combinations of thermoplastic and elastomeric materials generally known as TPEs and TPVs. Thermoplastic elastomer (TPE) and thermoplastic vulcanizate (TPV) materials have been developed to partially combine the desired properties of thermoplastics with the desired properties of elastomers. As such, TPV materials are usually multi-phase mixtures of vulcanized elastomer in thermoplastic. Traditionally, the vulcanized elastomer (vulcanizate) phase and thermoplastic plastic phase co-exist in phase mixture after solidification of the thermoplastic phase; and the mixture is liquefied by heating the mixture above the melting point of the thermoplastic phase of the TPV. TPE materials are multi-phase mixtures, at the molecular level, of elastomer and thermoplastic and are derived by polymerizing together monomers and/or oligomer of elastomer and thermoplastic. TPVs and TPEs both have melting points enabled by their respective thermoplastic phase and/or molecular aspects.

The elastomeric phase in traditional TPV materials provides a compressive set value (as further discussed in the following paragraph) from about 50 to about 100 percent between a non-vulcanized compression set value and a fully vulcanized compressive set value. In this regard, the non-vulcanized compressive set value is measured for elastomer gum in the initial combination of elastomeric gum (uncured elastomer) and thermoplastic used to make a thermoplastic vulcanizate; and the fully vulcanized compressive set value is measured for the vulcanizate (the cured material derived from the elastomeric gum) in the thermoplastic vulcanizate after it has been extensively vulcanized.

With respect to a difference between a non-vulcanized compressive set value for an elastomer (in the uncured elastomer or elastomer gum state) and a fully-vulcanized compressive set value for an elastomer, it is to be noted that percentage in the 0 to about 100 percent range (between a non-vulcanized compression set value respective to the uncured elastomer or elastomer gum and to a fully-vulcanized compression set value respective to the elastomer) applies to the degree of vulcanization in the elastomer or elastomer gum rather than to percentage recovery in a determination of a particular compression set value. As an example, an elastomer gum prior to vulcanization (uncured elastomer for the example) has a non-vulcanized compression set value of 72. After extended vulcanization, the vulcanized elastomer demonstrates a fully vulcanized compression set value of 10 (which could involve a 1000% recovery from a thickness measurement under compression to a thickness measurement after compression is released). A difference between the values of 72 and 10 indicate a range of 62 between the non-vulcanized compression set value respective to the uncured elastomer and a fully vulcanized compression set value respective to the cured elastomer. Since the compression set value decreased with vulcanization in the example, a compressive set value within the range of 50 to about 100 percent of a difference between a non-vulcanized compression set value respective to the uncured elastomer and a fully-vulcanized compression set value respective to the cured elastomer would therefore be achieved with a compressive set value between about 41 (50% between 72 and 10) and about 10 (the fully-vulcanized compression set value).

In various embodiments, uncured elastomers are characterized by a low level of vulcanization or cure as reflected or manifested in relatively low attainment of elastomeric properties. One of these properties is the compression set property. The compression set property of an uncured elastomer is less than 5 to 10 percent developed respective to the compression set value achieved during curing from the initially uncured to the fully-cured value as the elastomer is cured to achieve desired elastomeric properties for an application.

One characterization of uncured elastomer is elastomeric oligomer (a polymer compound which is built from about 2 to about 5 monomer units) that will be further incorporated into an elastomeric polymer via polymerization and/or vulcanization.

Another characterization of uncured elastomer is elastomer gum—effectively a relatively low molecular weight post-oligomer elastomeric precursor of a cured elastomeric material. More specifically, elastomer gum has a glass transition temperature, a decomposition temperature, and, at a temperature having a value that is not less than the glass transition temperature and not greater than the decomposition temperature, a compressive set value (as further described herein) from about 0 to about 5 percent of a difference between a non-vulcanized (non-cured) compressive set value for elastomer derived from the elastomer precursor gum and a fully-vulcanized (fully-cured) compressive set value for the derived elastomer. More specifically for fluoroelastomers, an elastomer gum has a Mooney viscosity of from about 0 to about 150 $ML_{1+10}$ at 121° Celsius when the relative fully vulcanized (fully-cured) elastomer is fluoroelastomeric.

Yet another form of uncured elastomer is provided with liquid elastomer that does not effectively provide a measurable compression set value that is less than about 100 percent.

Still another form of uncured elastomer is provided in a combination or blend of any of elastomeric oligomer, elastomer gum, and liquid elastomer. Indeed, commercial elastomeric gums frequently include intermixed oligomer.

A multilayer composite according to this description (for clarity, hereinafter referred to as "composite") is formed in the embodiments from at least one layer (an encoder target) comprising the magnetizable encoder material of the material embodiments of this description.

Turning now to further detail in the blended magnetizable encoder material, the magnetizable encoder material comprises a blend of elastomeric thermoplastic, uncured elastomer, and finely ground magnetic particulate where no curing agent is added for the uncured elastomer, where the uncured elastomer is cured into elastomer with radiation, and where the uncured elastomer as dispersed into the thermoplastic effectively provides a polymeric binder for the blended magnetizable encoder material. In each successful blend, the materials are blended to achieve acceptable magnetic properties for an encoder target and to have a polymeric binder having a $\tan\_\delta_{DMTA}$ value (a dynamic mechanical thermal analyzer tangent delta value) less than or equal to 0.1 in an independently cured un-magnetizable sample of the polymeric binder, when that sample of polymeric binder is independently prepared by dispersing the uncured elastomer into the thermoplastic without dispersing of any of the magnetizable particulate and then by curing the dispersed uncured elastomer with the radiation, at a temperature not less than the liquefaction supra point temperature of the thermoplastic.

The dynamic mechanical thermal analyzer tangent delta value (tan_$\delta_{DMTA}$) derives as further defined in ASTM E 1640-94 as a measurable property of a material at any particular temperature. The tan_$\delta_{DMTA}$ value can further be understood as a ratio of $\epsilon''$ to $\epsilon'$ where $\epsilon'$ is the storage modulus of the material at a temperature and $\epsilon''$ is the loss modulus of the material at the same temperature. The loss modulus is related to the viscosity of the material and the storage modulus is related to the elasticity of the material. For blends of thermoplastic and elastomer such as the polymeric binder embodiments described herein, the effective balance between viscosity and elasticity is therefore a measurable indicator of how the blended material will process when the material is at a temperature greater than the liquefaction supra point temperature (for many thermoplastics, the liquefaction supra point temperature is essentially identical in value with the commonly referenced melting point temperature) for the thermoplastic in the blend. In this regard, the elastomer of the cured polymeric binder blend will not "melt" as the temperature increases, and the material will continue to have a relatively thick viscosity even when the thermoplastic continuum of the blend has fully melted.

In order to be robust in application, the magnetizable encoder material embodiments described herein also require an appropriate elasticity. In a thermoplastic elastomer based embodiment, this elasticity is provided to some degree from the elastomeric aspect of the thermoplastic elastomer. In a thermoplastic vulcanizate based embodiment, this elasticity is provided to some degree from the elastomeric aspect of the suspended vulcanizate particles. However, in addition to the elastomeric thermoplastic (either TPE or TPV) base, additional elastomer needs to be added in order to achieve the desired robustness (elasticity) and to also provide polymer to hold the necessary portion of the magnetic particulate needed for the desired magnetic loading.

In this regard, a high loading of magnetic material in thermoplastic will diminish the robustness of the blend insofar as the blended material becomes progressively brittle as the amount of magnetic particulate in the blend progressively increases. This is a difficulty even when either thermoplastic elastomers or thermoplastic vulcanizates provide a base for the material in the absence of further elastomer. However, if some of the magnetic particulate can be suspended in the elastomer, then the brittleness issue is somewhat relieved. It is to be noted that, in a thermoplastic vulcanizate, the suspended elastomer phase cannot intermix with magnetic particulate. U.S. patent application Publication No. 2004/0183702 (Nachtigal et al.) entitled "Magnetizable Elastomer Compositions" filed Jan. 20, 2004 discusses one solution to this issue through a process of dynamically vulcanizing a blend of uncured elastomer, thermoplastic, and magnetic particulate.

Dynamically vulcanized magnetizable encoder target materials as discussed in U.S. patent application Publication No. 2004/0183702 provide a significant improvement over directly blended magnetic material and elastomeric thermoplastic in resolving the complex and interrelated properties related to processability and mechanical robustness in the blended material. However, as further described herein, the properties of dynamically vulcanized magnetizable encoder materials are apparently affected (and, to some degree, afflicted) by the presence of curing agent (an agent or ingredient for cross-linking uncured elastomer materials into elastomer) in the blend. In this regard, curing agent is added during dynamic vulcanization and is not conveniently or economically extractable from the product material after dynamic vulcanization has been achieved. Furthermore, the use of curing agent to cure or vulcanize elastomer generates residual reaction contaminants as micro-bubbles of gas and/or microphases of liquid within the polymer continuum as a byproduct of the curing and/or vulcanization process; these residual contaminants are believed to cause some degree of material performance shortfall (with especial reference to chemical agent robustness and/or thermal exposure robustness) from the material performance that can be achieved if the uncured elastomer is vulcanized (cured) without use of a curing agent.

It has been discovered that one solution to the curing agent effect in these blends is to effectively vulcanize very well dispersed and very finely sized uncured elastomer in the blend and then to cure the uncured elastomer into elastomer without the presence of a curing agent for the uncured elastomer. In this regard, a blend of thermoplastic elastomer, uncured elastomer, and appropriately sized magnetizable particulate is admixed until the uncured elastomer has been thoroughly dispersed, the uncured elastomer has been dispersed as particles having a very small independent diameters, and some of the magnetic particulate has been disposed within some of the uncured elastomer particles so that a fully blended admixture has been formed. But it is to be especially noted that the blend is essentially devoid, except for trace amounts that may be present from happenstance, of curing agent for the elastomer. The uncured elastomer in the blend is then cured or vulcanized by use of irradiation, preferably electron beam radiation as will be further described herein. Preferably, the fully blended material is formed into an object precursor item (such as an encoder target precursor) and then the uncured elastomer in the object is cured or vulcanized by use of irradiation so that the final object is provided.

For material blends having these relatively high magnetic particulate and elastomeric particulate loadings, the tan_$\delta_{DMTA}$ measurement for the polymeric binder, when independently prepared and analyzed as further described herein, is useful in affording a predictor of acceptability in a material for both (a) robustness in thermal resistance and fluid resistance for the encoder target application and (b) processability for molding and/or extrusion (especially for pultrusion).

Figure 2:
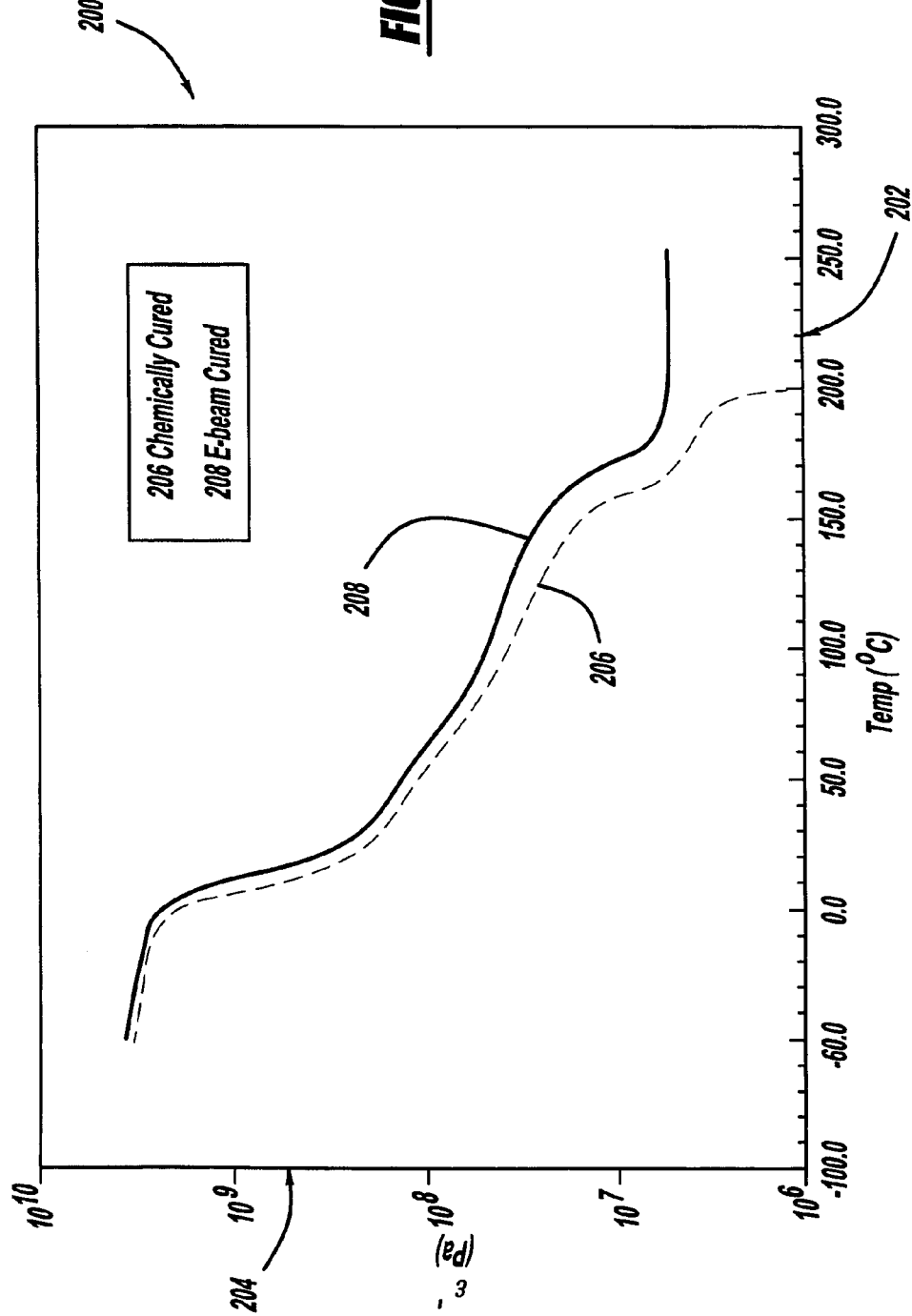
FIG. 2 presents a graph of storage modulus ($\epsilon'$) measurements as a function of temperature for the polymeric binders of FIG. 1.
Figure 3:
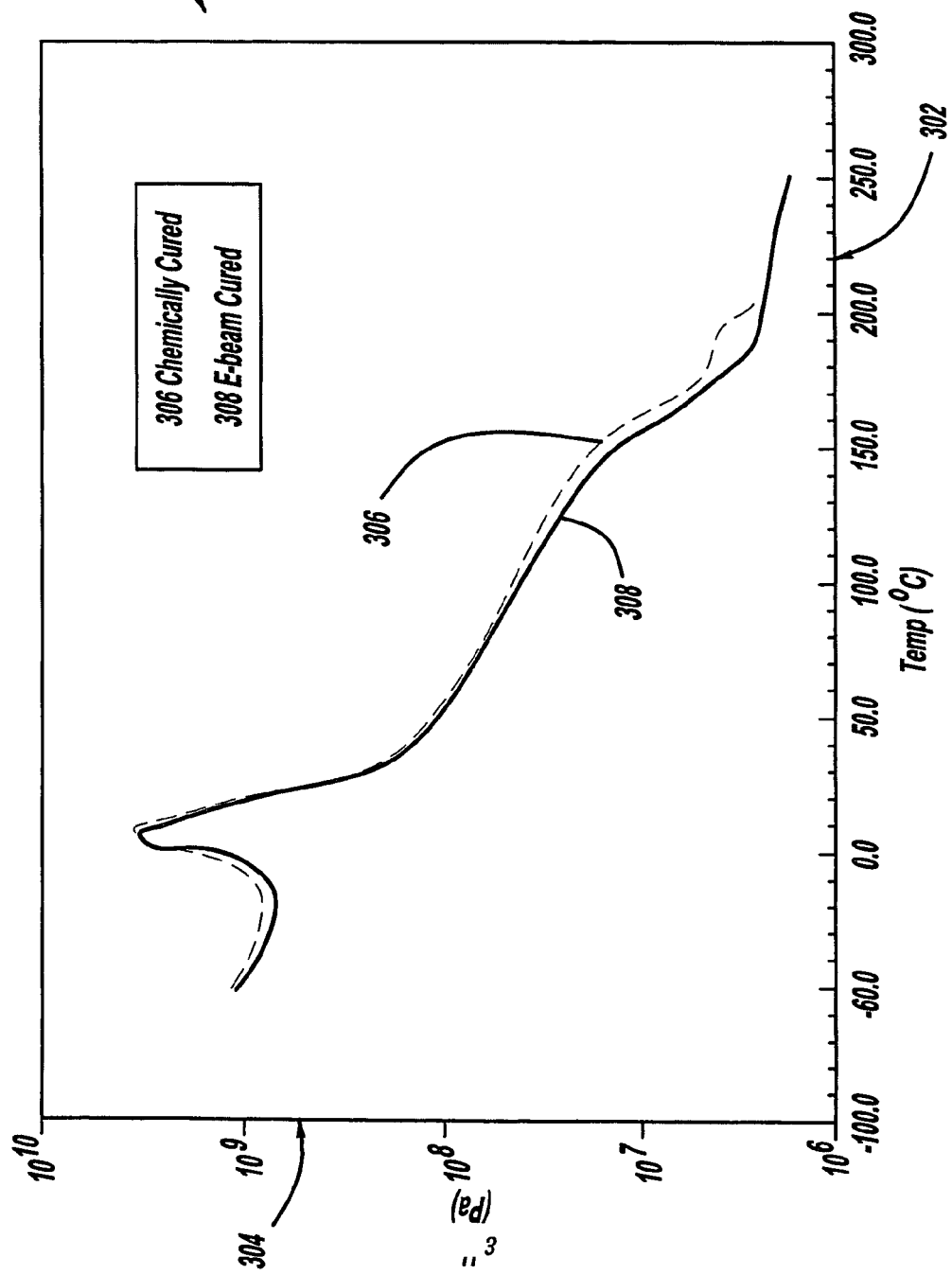
FIG. 3 presents a graph of loss modulus ($\epsilon''$) measurements as a function of temperature for the polymeric binders of FIG. 1.

Turning now to the FIGs., further specifics in appreciating the interrelationships of the tan_$\delta_{DMTA}$ value, the loss modulus ($\epsilon''$), the storage modulus $\epsilon'$, and the influence on these properties from curing agent are provided from consideration of detail in FIG. 1, FIG. 2, and FIG. 3.

FIG. 1 presents graph 100 of tan_$\delta_{DMTA}$ measurements as a function of temperature for polymeric binder embodiments from curing dispersed uncured elastomer in thermoplastic as further described herein and specifically in the Examples (especially Example 8). Axis 104 shows tan_$\delta_{DMTA}$ values and axis 102 shows temperature values. Data values from which locus 106 derives are from a chemically-cured (curing-agent-cured) blend of the polymeric binder, and data values from which locus 108 derives are from a radiation-cured (electron beam cured) blend of the polymeric binder.

FIG. 2 presents graph 200 of storage modulus ($\epsilon'$) measurements as a function of temperature for the polymeric binders of FIG. 1. Axis 204 shows storage modulus ($\epsilon'$) values and axis 202 shows temperature values (note that axis 202 and axis 102 have identical granularity, span, and end values). Data values from which locus 206 derives are from the chemically cured blend of the polymeric binder, and data values from which locus 208 derives are from the radiation cured (electron beam cured) blend of the polymeric binder.

FIG. 3 presents graph 300 of loss modulus ($\epsilon''$) measurements as a function of temperature for the polymeric binders of FIG. 1. Axis 304 shows loss modulus ($\epsilon''$) values and axis 302 shows temperature values (note that axis 302, axis 202, and axis 102 have identical granularity, span, and end values). Data values from which locus 306 derives are from the chemically cured blend of the polymeric binder, and data values from which locus 308 derives are from the radiation cured (electron beam cured) blend of the polymeric binder.

In joint consideration of graphs 100, 200, and 300, storage modulus loci 206 and 208, when viewed from left to right in graph 200, are essentially identical in value to about 50° Celsius, begin to separate slightly up to about 150° Celsius, and then both show a definite intensification in rate of decline at about 150° Celsius. This marks the effective supra point for the liquifaction range (the liquefaction supra point) for the cured polymeric binder. Note that the storage modulus effectively shows a constant value above 200° Celsius for the radiation-cured material (locus 208) while the curing-agent-cured material continues to demonstrate dramatic storage modulus decline (locus 206). Loss modulus loci 306 and 308, when viewed from left to right in graph 300, both show a minor separation at about 150° Celsius, but the loss modulus behavior for both the radiation-cured material (locus 308) and the curing-agent-cured material (locus 306) are substantially similar through the plotted ranges of data for both loci. Turning now to graph 100, the impact of the differentiated behavior in storage modulus can be viewed in the $\tan\_\delta_{DMTA}$ measurements for the two materials. In this regard, $\tan\_\delta_{DMTA}$ loci 106 and 108, when viewed from left to right in graph 100, are essentially identical in value to about 50° Celsius, and then begin to separate with locus 106 showing an increase in value above 50° Celsius, and with locus 108 showing an progressive decrease in value above 50° Celsius. Above 150° Celsius (the liquefaction supra point as previously identified with respect to graph 200), the $\tan\_\delta_{DMTA}$ measurement is not greater than a value of 0.1 for the radiation-cured polymeric binder of locus 108. Above 150° Celsius (the liquefaction supra point as previously identified with respect to graph 200), the $\tan\_\delta_{DMTA}$ measurement is consistently (and increasingly with temperature) greater than a value of 0.1 for the curing-agent-cured polymeric binder of locus 106.

Note that all loci of graphs 100, 200, and 300 show a peak or definite "shoulder" at about 10° C.—this marks the effective glass transition temperature for the thermoplastic of the polymeric binder. Both loss modulus loci of graph 300 show a lower value from the peak below 10° C.; this is believed to be related either to tractive phenomena between an essentially solid sample and the connection pads of the loss modulus measuring system or to resonance-hysteretic aspects in an essentially solid sample respective to the vibration frequency of the connection pads of the loss modulus measuring system.

Turning now to specific thermoplastics for use in the embodiments, thermoplastics in various embodiments include polyvinylidene fluoride, copolymer of ethylene-tetrafluoroethylene (ETFE), copolymer of ethylene-chlorotrifluoroethylene (ECTFE), fluorinated plastic (fluoroplastic or FEP), terpolymer of tetrafluoroethylene-hexafluoropropylene-vinylidene-fluoride (THV), copolymer of trifluoroethylene-perfluoromethylvinylether (MFA), copolymer of tetrafluoroethylene-perfluoromethylvinylether (ANS), perfluoroalkoxy (PFA), polyurethane, nylon 6, nylon 66, nylon 64, nylon 63, nylon 610, nylon 612, amorphous nylon, polyester, polyolefin, polyphenylene sulfide, polyesteretherketone, polyimide, polysulfone, thermoplastic polyurethane, terpolymer of acrylonitrile-butadiene-styrene, polyvinylchloride, polystyrene, polymethyl methacrylate, polycarbonate, polybutylene, cellulosic plastic, polyacrylate, and polyacetal, thermoplastic elastomer, and thermoplastic vulcanizate, and combinations thereof. Preferred thermoplastics are thermoplastic elastomer and thermoplastic vulcanizate. More preferred thermoplastic elastomers include polyamide/polyether thermoplastic block co-polymer elastomer (commercially available from Atofina under the Pebax trade name), polyester/polyether thermoplastic block co-polymer elastomer (commercially available from DuPont under the Hytrel trade name), thermoplastic polyurethane copolymer, copolymer of styrene-butadiene-styrene, terpolymer of styrene-ethylene-butylene-styrene, terpolymer of styrene-isobutylene-butadiene-styrene, and combinations thereof. More preferred thermoplastic vulcanizates include ethylene acrylic elastomers (AEM) commercially available from Dupont under the ETPV tradename, acrylate monomer-rubber (ACM) vulcanizate dispersed in nylon (commercially available from Zeon Chemical under the Zeotherm tradename), silicone vulcanizate dispersed in nylon (commercially available from Dow Corning under the TPSiV tradename), ethylene-propylene-diene monomer rubber dispersed in polypropylene (commercially available from AES or Advanced Elastomeric Systems under the Santoprene tradename), or Fluoroprene® FKM-TPV fluoroelastomer in fluorinated thermoplastic (available from Fruedenberg-NOK General Partnership), and combinations thereof.

An example of a TPE advantageously employed in the embodiments is Hytrel™ thermoplastic polyester elastomer, sold by Dupont or Pebax™ thermoplastic polyamide elastomer sold by Atofina.

Turning now to the added elastomers of the blend embodiments, the elastomers will be discussed in terms of their cured designation. However, it is to be appreciated that the pre-cured or uncured form of each elastomer (such as the elastomeric oligomer form, liquid elastomer form, or elastomer gum form) is also being referenced as each elastomer composition is chemically identified.

Turning now to specific elastomers for use in the embodiments, preferred elastomers and preferred uncured elastomers for curing into those elastomers in various embodiments include elastomers of fluoroelastomer (FKM), polyacrylate elastomer (ACM) such as Vamac™ G, sold by Dupont, ethylene acrylic elastomer (AEM), nitrile butyl rubber elastomer (NRB), hydrogenated nitrile butyl rubber elastomer (HNBR), polyurethane elastomer (PU), silicone elastomer, ethylene propylene diene monomer elastomer (EPDM), natural rubber elastomer, polyethylene-vinyl acetate elastomer (EVA), styrene-butadiene rubber (SBR), natural rubber, and combinations thereof.

The AEM elastomers are, in some embodiments, used as "solid plasticizers" to toughen, i.e., increase elongation and decrease tensile strength of the TPE compounds, but without sacrifice of heat aging performance. In an alternative embodiment, polyacrylate elastomer (ACM) elastomers are employed instead of AEM elastomers to "plasticize" TPE based compounds; examples of ACMs include Nypol™ and Hytemp™ as sold by Zeon and Noxtite™ as sold by Unimatec.

An especially preferred elastomer for the polymeric binder and magnetizable material embodiments is fluoroelastomer (FKM) selected to provide suitable flow characteristics, physical properties, chemical properties, and compatibility with the environment of use. The elastomer designation gives the monomers from which the elastomer gums are synthesized. In various embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

Figure 4:
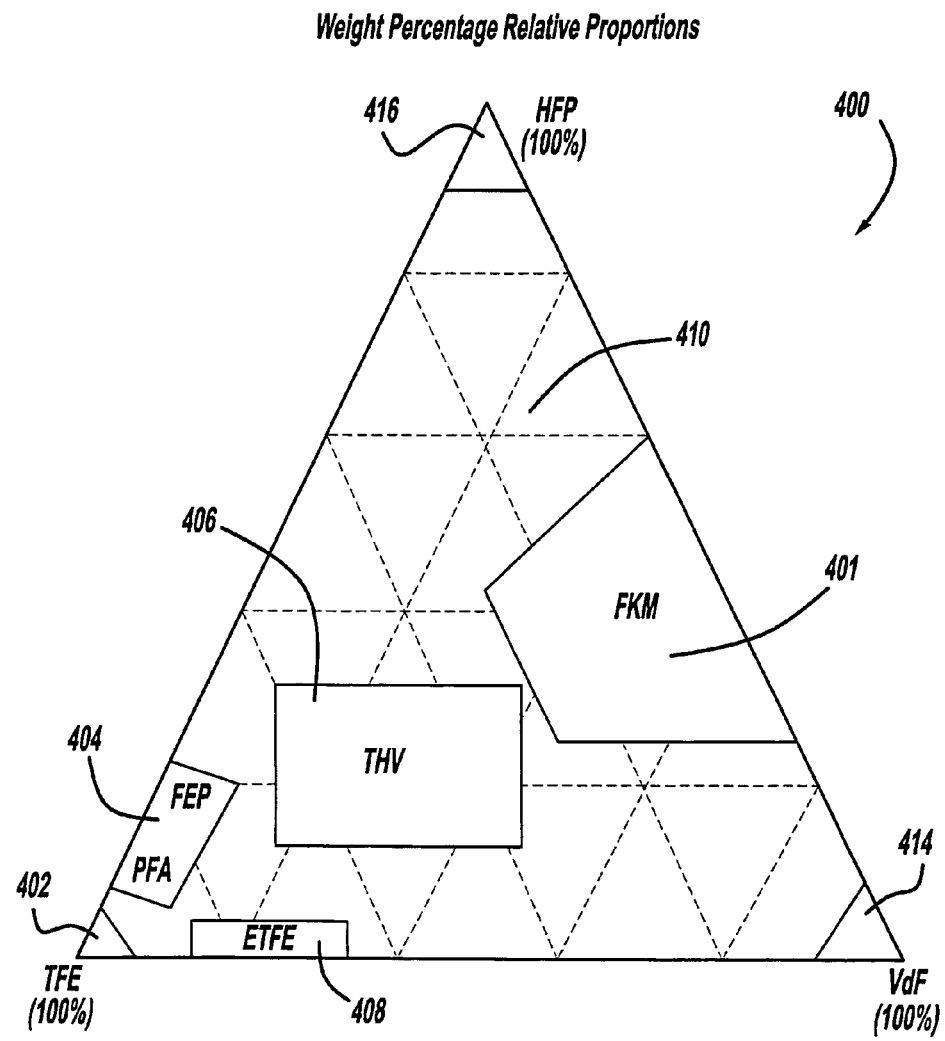
FIG. 4 presents a ternary composition diagram showing mutually relative tetrafluoroethylene (TFE), hexfluoropropylene (HFP), and vinylidene fluoride (VdF) weight percentage proportions (combinations) for making various co-polymer elastomers.

Further detail in the nature of fluoroelastomer of for the polymeric binder and magnetizable material embodiments is appreciated from a consideration of FIG. 4, ternary composition diagram 400 showing mutually relative tetrafluoroethylene (TFE), hexfluoropropylene (HFP), and vinylidene fluoride (VdF) weight percentage combinations (weight percentage combinations that are mutually respective to the sum of only the TFE/HFP/and VdF weight percentage amounts in a co-polymer) for making various co-polymer elastomers. Region 401 defines blends of mutually respective tetrafluoroethyl, hexfluoropropyl, and vinylidyl fluoride overall weight percentage amounts that combine in forming fluoroelastomer polymers of the type designated as FKM (for copolymer rubbers based on vinylidene fluoride). Region 404 defines blends of mutually respective tetrafluoroethyl, hexfluoropropyl, and vinylidyl fluoride overall weight percentage amounts that combine in forming perfluoroalkoxy/tetrafluoroethylene copolymer, tetrafluoroethylene/perfluoromethylvinylether copolymer, tetrafluoroethylene/perfluorovinylether copolymer, and tetrafluoroethylene/hexafluoropropylene copolymer (note that the amount of an alkoxy monomer in the copolymer is not indicated in the ternary diagram). Region 406 defines blends of mutually respective tetrafluoroethyl, hexfluoropropyl, and vinylidyl fluoride overall weight percentage amounts that combine to form tetrafluoroethylene/hexafluoropropylene/vinylidene fluoride polymers. Region 408 defines blends of mutually respective tetrafluoroethyl, hexfluoropropyl, and vinylidyl fluoride overall weight percentage amounts that combine to form ethylene tetrafluoroethylene polymers (note that the amount of ethylene monomer in the copolymer is not indicated in the ternary diagram). Region 410 defines blends of mutually respective tetrafluoroethyl, hexfluoropropyl, and vinylidyl fluoride overall weight percentage amounts that traditionally have not generated useful co-polymers. Region 402 defines blends of mutually respective tetrafluoroethyl, hexfluoropropyl, and vinylidyl fluoride overall weight percentage amounts that combine to form polytetrafluoroethylene (PTFE) polymers. Region 414 defines blends of mutually respective tetrafluoroethyl, hexfluoropropyl, and vinylidyl fluoride overall weight percentage amounts that combine to form polyvinylidene fluoride (PVDF) polymers. Region 416 defines blends of mutually respective tetrafluoroethyl, hexfluoropropyl, and vinylidyl fluoride overall weight percentage amounts that combine to form polyhexfluoropropylene (PHFP) polymers.

Note that, in the above, additional monomer and/or oligomer materials may be co-polymerized with the HFP, TFE, and VdF materials; FIG. 1 addresses the mutually-relative weight percentage amounts of HFP, TFE, and VdF in proportion to the sum of only these three monomers in the polymer. For instance, Regions 404 and 408 each include other monomer materials in addition to HFE, TFE, and VdF, even as the mutually-relevant weight percentage amounts of HFP, TFE, and VdF are shown with respect to each other. Above the "surface" of the triangle of the ternary diagram, other monomers such as, without limitation, alkoxy, ethylene, and/or propylene may be therefore visualized.

Non-limiting examples of specific fluorocarbon elastomers for the uncured elastomer phase of the polymeric binder and magnetizable material embodiments include:

(i) vinylidene fluoride/hexafluoropropylene copolymer fluoroelastomer having from about 66 weight percent to about 69 weight percent fluorine and a Mooney viscosity of from about 0 to about 130 $ML_{1+10}$ at 121° Celsius (commercially available, for example, from DuPont under the Viton trade name in the Viton® A series or from 3M under the Dyneon trade name in the Dyneon® FE series);

(ii) vinylidene fluoride/perfluorovinylether/tetrafluoroethylene terpolymer fluoroelastomer having at least one cure site monomer and from about 64 weight percent to about 67 weight percent fluorine and a Mooney viscosity of from about 50 to about 100 $ML_{1+10}$ at 121° Celsius (commercially available, for example, from DuPont under the Viton® GLT series or the Viton® GFLT series);

(iii) tetrafluoroethylene/propylene/vinylidene fluoride terpolymer fluoroelastomer having from about 59 weight percent to about 63 weight percent fluorine and a Mooney viscosity of from about 25 to about 45 $ML_{1+10}$ at 121° Celsius (commercially available, for example, from Asahi under the Aflas trade name in the Aflas® 200 series or from 3M in the Dyneon® BRE series);

(iv) tetrafluoroethylene/ethylene/perfluorovinylether terpolymer fluoroelastomer having at least one cure site monomer and from about 60 weight percent to about 65 weight percent fluorine and a Mooney viscosity of from about 40 to about 80 $ML1_{+10}$ at 121° Celsius (commercially available, for example, from DuPont under the Viton® ETP 900 series or the Viton® ETP 600 series);

(v) vinylidene fluoride/hexafluoropropylene/tetrafluoroethylene terpolymer fluoroelastomer having at least one cure site monomer and from about 66 weight percent to about 72.5 weight percent fluorine and a Mooney viscosity of from about 15 to about 90 $ML_{1+10}$ at 121° Celsius (commercially available, for example, from Solvay under the Technoflon trade name in the Technoflon® series or from DuPont under the Viton® B series);

(vi) tetrafluoroethylene/propylene copolymer fluoroelastomer having about 57 weight percent fluorine and a Mooney viscosity of from about 25 to about 115 $ML_{1+10}$ at 121° Celsius (commercially available, for example, from Asahi under the in the Aflas® 100 series or from DuPont under the Viton® TBR series);

(vii) tetrafluoroethylene/hexafluoropropylene/perfluorovinylether/vinylidene fluoride tetrapolymer fluoroelastomer having at least one cure site monomer and from about 59 weight percent to about 64 weight percent fluorine and a Mooney viscosity of from about 30 to about 70 $ML1_{+10}$ at 121° Celsius (commercially available, for example, from 3M under the in the Dyneon® LTFE series);

(viii) tetrafluoroethylene/perfluorovinylether copolymer fluoroelastomer having at least one cure site monomer and from about 69 weight percent to about 71 weight percent fluorine and a Mooney viscosity of from about 60 to about 120 $ML1_{+10}$ at 121° Celsius (commercially available, for example, from DuPont in the Viton® Kalrez series); and (ix) fluoroelastomer corresponding to the formula:

 Formula I where TFE is essentially tetrafluoroethyl, HFP is essentially hexfluoropropyl, VdF is essentially vinylidyl fluoride, and products qd and rd and sd collectively provide mutually respective (mutually relevant) weight percent proportions of TFE, HFP, and VdF whose values are within element 401 of FIG. 4. In this regard, q, r, s, and d conceptually reference the integer number of radicalized monomer-derived blocks (monomeric blocks) in a portional block of the elastomeric polymer with d conceptually referencing the integer number of portional blocks. In any one portional block (an instance of d), any of q, r, or s could have a zero value, an integer value of 1, or an integer value greater than 1. However, collectively, the set of all monomers (all q, r, and s of, respectively, TFE, HFP, and VdF) in all portional blocks ("d") in all molecules will provide mutually respective weight ratios of TFE, HFP, and VdF, mutually respective to the sum of only these three particular monomers, in the materials that will fall within element 401 of FIG. 4. With further respect to the portional block (an instance of d), the d block, in one context, references the incorporation of oligomeric (sub-macro) molecules in the growth of a polymeric macromolecule or polymeric chain. In another context, the d block references the incorporation of a series of monomer units between two assimilated oligomeric (sub-macro) molecules in the growth of a polymeric macromolecule or polymeric chain. In one extrapolated context, a block of d is an entire macromolecule.

When the target encoder layer comprises fluoroelastomeric thermoplastic (FKM-TPV), the magnetizable polymer effectively is a multiphase composition having a continuous phase of a fluoroplastic thermoplastic polymer material and an amorphous phase comprising a fluoroelastomer where the amorphous phase is dispersed in the continuous phase. The thermoplastic phase has at least one of either (a) a glass transition temperature of 0° Celsius or above or (b) a melting point.

The magnetizable compositions comprise magnetizable particulate in the form of powder or fiber dispersed in the polymeric binder, the magnetizable particulate including such powders that are known in the art. As previously indicated, the magnetic particulate is sized such that essentially all of the independent particles of the magnetizable particulate have a minimum diameter not greater than about 1000 microns with not greater than 50% of the particle count (more preferably 60%, most preferably 70%) having have a minimum diameter not greater than about 100 microns. A preferable form of magnetizable particulate is magnetizable powder. Other forms include metallic stands (fibril particulate), oval-shaped particulate, and essentially spherical particulate. In various embodiments, magnetizable particulate is selected from the group consisting of magnetizable ferrites (including materials such as strontium-ferrite oxide and barium-ferrite oxide), ferrite alloys (including materials such as those containing aluminum and nickel and cobalt), rare-earth ferrite granulate; and mixtures thereof. Other embodiments use copper. An example of a suitable ferrite alloy containing aluminum and nickel and cobalt is Alnico™ (available from MMC Magnetics of Hauppauge, N.Y.). Commercial ferrite powder embodiments include HM170i Starbond™ ferrite powder (commercially available from Hoosier Magnetics Corporation of Washington, Ind.), HM180 Hexabond™ ferrite powder (commercially available from Hoosier Magnetics Corporation of Washington, Ind.), and FH801 ferrite powder (commercially available from Toda Kogya Corporation of Hiroshima, Japan). Rare earth particulates are made from metals including samarium, cobalt, zirconium, and rare earth metal alloys such as neodymium-iron-boron and samarium cobalt. Combinations of any of the above are used in yet other embodiments.

The relative amount of magnetizable particulate needed in the magnetizable blend embodiments depends on the chemical composition of the magnetizable particulate. When ferrite powder or ferrite powder alloy essentially provides the magnetizable particulate, the magnetizable blend embodiments independently comprise from about 70 weight percent to about 95 weight percent (preferably from about 70 weight percent to about 90 weight percent) magnetizable particulate. When a rare earth metal material or rare earth metal alloy material essentially provides the magnetizable particulate, the magnetizable blend embodiments independently comprise from about 15 weight percent to about 50 weight percent (more preferably from about 15 weight percent to about 40 weight percent) of magnetizable particulate. When combinations of ferrite materials and rare earth materials are used, the magnetizable blend embodiments independently comprise from about 15 weight percent to about 95 weight percent (preferably, from about 15 weight percent to about 90 weight percent) of magnetizable particulate depending on the relative amounts of ferrite material and rare earth material. In all cases, however, the magnetic particulate in the cured and finished item (the encoder target) made from the material must be of a chemistry, shape, sizing, relative amount within the magnetizable blend, and dispersion such that, respective to the polymer blend in which it is dispersed, (a) a first magnetic field in a first portion in a solidified block (the block having a length of about 1 centimeter, a width of about 1 centimeter, and a thickness of about 50 millimeters) of the magnetizable composition is differentiated from a second magnetic field in a second portion of that block by not less than 200 Gauss when measured across an air detection gap of about 1 mm, and (b) the composition has (or is radiation curable to provide) cured magnetizable material. The polymeric binder of the magnetizable material provides, when a separate sample of the polymeric binder is independently prepared into cured un-magnetizable polymeric binder by dispersing the uncured elastomer into the thermoplastic (without dispersing of any of the magnetizable particulate) and then by curing the dispersed uncured elastomer with the radiation, a dynamic mechanical thermal analyzer tangent delta value not greater than 0.1 at a temperature not less than the liquefaction supra point temperature of the thermoplastic in the cured polymeric binder.

The processable multiphase compositions for use as magnetizable polymer of this description may be manufactured in a batch process or a continuous process. The process of making some compositional embodiments, in which magnetic material is incorporated into a blend of thermoplastic material and elastomeric material prior to curing of the elastomer, provides both thermoplastic and vulcanizate phases in the blended and cured material as carriers for the magnetic materials. This allows for high volume matrix loadings of magnetic material even as desired material properties are achieved. In this regard, an advantage of the embodiments is that a material is provided that combines (a) mechanical and environmental durability advantages normally provided by thermoset-elastomer-based magnetic compounds under the range of environmental conditions needed for vehicle encoder applications with (b) ease of processing and manufacturing offered by engineered thermoplastics.

In a batch process, predetermined charges of elastomeric material, thermoplastic material and magnetizable particulate are added to a mixing apparatus. In a typical batch procedure, the elastomeric material and thermoplastic material are first mixed, blended, masticated or otherwise physically combined until a desired particle size of elastomeric material is provided in a continuous phase of thermoplastic material. When the structure of the elastomeric material is as desired, the magnetic particulate may be added while continuing to apply mechanical energy to mix the fluoroelastomeric material and thermoplastic material. Curing is effected by irradiation after forming either profiled extrudate or the final encoder target article. In an alternative embodiment, the irradiation cures the material after mixing has been completed.

When cure is complete, the processable multiphase composition may be removed from the reaction vessel (mixing chamber) for further processing. It is believed that more magnetic material can be loaded into the magnetizable material embodiments of the present invention when compared to the dynamically vulcanized magnetizable materials of U.S. patent application Publication No. 2004/0183702 at any given thermal resistance and fluid resistance robustness state for the compared materials.

It is preferred to mix the fluoroelastomeric material and thermoplastic material at a temperature where the thermoplastic material softens and flows.

Continuous processes are also used to prepare elastomer-containing magnetizable polymer of this description. In a preferred embodiment, a twin screw extruder apparatus, either co-rotation or counter-rotation screw type is provided with ports for material addition and reaction chambers made up of modular components of the twin screw apparatus. In a typical continuous procedure, thermoplastic material and elastomeric material are combined together by inserting them into the screw extruder together in a first hopper using a feeder (loss-in-weight or volumetric feeder). Temperature and screw parameters may be adjusted to provide a proper temperature and shear to effect desired mixing and to achieve particle size distribution of an uncured elastomeric component in a thermoplastic polymer material matrix. Mixing duration may be controlled either by adjusting the length of the extrusion apparatus and/or by controlling the speed of screw rotation for the mixture of fluoroelastomeric material and thermoplastic material during the mixing phase. The degree of mixing may also be controlled by the mixing screw element configuration in the screw shaft, such as intensive, medium or mild screw designs. The magnetizable particulate is introduced through a second hopper using a feeder (loss-in-weight or volumetric feeder) at a point where the elastomeric material is fully dispersed in desired particulation into the thermoplastic.

Elastomer-containing polymeric binder compositions of this description will contain a sufficient amount of vulcanized elastomeric material ("rubber") after curing to form a rubbery composition of matter; that is, they will exhibit a desirable combination of flexibility, softness, and compression set as well as a tangent delta value of not greater than 0.1. The polymer of the polymeric binder compositions should comprise from about 1 weight percent to about 99 weight percent (preferably from about 50 weight percent to about 99 weight percent, more preferably from about 80 weight percent to about 90 weight percent) thermoplastic elastomer when the thermoplastic continuum is thermoplastic elastomer. Preferably, the polymer of the polymeric binder compositions should comprise from about 1 weight percent to about 50 weight percent (more preferably, from about 20 weight percent to about 50 weight percent) thermoplastic vulcanizate when the thermoplastic continuum is thermoplastic from a thermoplastic vulcanizate. More specifically, the vulcanizate within the thermoplastic vulcanizate is generally from about 30 to about 95 percent by weight, preferably from about 35 to about 85 percent by weight, and more preferably from about 50 to about 80 percent by weight of the total weight of the vulcanizate and the thermoplastic polymer combined in the thermoplastic vulcanizate before the uncured elastomer is added.

The amount of thermoplastic polymer within the thermoplastic vulcanizate before the uncured elastomer is added is generally from about 15 to about 70 percent by weight, preferably from about 15 to about 65 percent by weight and more preferably from about 20 to about 50 percent by weight of the total weight of the vulcanizate and the thermoplastic combined in the thermoplastic vulcanizate.

Preferably, the thermoplastic vulcanizate itself is a homogeneous mixture wherein the elastomer vulcanizate is in the form of finely divided and well-dispersed elastomer vulcanizate particles of less than 10 microns within a non-vulcanized matrix.

It should be understood, that uncured elastomer in the blends of the this description are not limited to those containing discrete phases inasmuch as some compositional embodiments may also include other morphologies such as co-continuous morphologies.

The term vulcanized or cured elastomer vulcanizate refers to a synthetic elastomer vulcanizate that has undergone at least a partial cure. The degree of cure can be measured in one method by determining the amount of elastomer vulcanizate that is extractable from the cured polymeric binder material by using boiling xylene or cyclohexane as an extractant. This method is disclosed in U.S. Pat. No. 4,311,628 entitled "Thermoplastic Elastomeric Blends of Olefin Rubber and Polyolefin Resin," issued Jan. 19, 1982 to Abdou-Sabet et al. By using this method as a basis, the cured elastomers of this description will have a degree of cure where not more than 15 percent of the elastomer vulcanizate is extractable, preferably not more than 10 percent of the elastomer vulcanizate is extractable, and more preferably not more than 5 percent of the elastomer vulcanizate is extractable. In an especially preferred embodiment, the elastomer is technologically fully vulcanized. The term fully vulcanized refers to a state of cure such that the elastomer crosslink density is at least $7 \times 10^{-5}$ moles per ml or such that the elastomer is less than about three percent extractable by cyclohexane at 23° C.

The degree of cure in neat polymeric binder can be determined by the cross-link density of the elastomer (rubber). This, however, must be determined indirectly because the presence of the thermoplastic polymer interferes with the determination. Accordingly, the same elastomer vulcanizate as present in the blend is treated under conditions with respect to time, temperature, and amount of radiation that result in a fully cured product as demonstrated by its cross-link density. This cross-link density is then assigned to the blend similarly treated. In general, a cross-link density of about $7 \times 10^{-5}$ or more moles per milliliter of cured polymeric binder material is representative of the values reported for fully cured elastomeric copolymers. Accordingly, it is preferred that the cured polymeric binder material is vulcanized by radiation to give a cross-link density greater than about $7 \times 10^{-5}$ moles per milliliter of elastomer vulcanizate and preferably greater than about $1 \times 10^{-4}$ moles per milliliter of cured material.

In embodiments with uncured elastomer, one method for making the multiphase composition is to mix the uncured (elastomeric oligomer, elastomer gum, liquid elastomer, or combinations thereof) elastomer component and the thermoplastic polymer with a conventional mixing system such as a batch polymer mixer, a roll mill, a continuous mixer, a single-screw mixing extruder, a twin-screw extruder mixing extruder, and the like until the uncured elastomer has been fully mixed and the uncured elastomeric amorphous phase portions (particles) have independent diameters (or independent maximum cross sectional diameters) of from about 0.1 microns to about 100 microns in the thermoplastic phase and such that each of essentially all of the particles of uncured elastomer is independently not greater than 100 microns minimum essential diameter. When elastomeric material and thermoplastic material are to be melt-blended, mixing necessarily occurs above the softening or melting point of the higher melting component. In one embodiment, the multiphase polymeric binder composition derives from mixing uncured elastomer into the thermoplastic to provide from about 1 to about 99 weight percent (preferably from about 10 to about 80 weight percent) of uncured elastomer in the polymer of the polymeric binder of the multiphase composition, and the uncured elastomer is mixed to provide a co-continuous polymer matrix multiphase composition having independent uncured elastomer portion cross-sectional maximum diameters (phase cross-sectional thickness dimensions as measured at various locations in the co-continuous polymer matrix multiphase composition) of from about 0.1 microns to about 100 microns.

Mixing of different polymeric phases in making uncured polymeric binder is controlled by relative viscosity between two initial polymeric fluids (where the first polymeric fluid has a first viscosity and the second polymeric fluid has a second viscosity). The phases are differentiated during admixing of the admixture from the two initial polymeric fluids. In this regard, the phase having the lower viscosity of the two phases will generally encapsulate the phase having the higher viscosity. The lower viscosity phase will therefore usually become the continuous phase in the admixture, and the higher viscosity phase will become the dispersed phase. When the viscosities are essentially equal, the two phases will form a co-continuous phase matrix or polymer system (also denoted as an interpenetrated structure) of polymeric macromolecules and/or minutely dimensioned polymeric portions. Accordingly, in general dependence upon the relative viscosities of the mixed elastomer and thermoplastic, several embodiments of mixed compositions derive from the general mixing approach. Preferably, each of the vulcanized, partially vulcanized, or gum elastomeric dispersed portions in a polymeric admixture has a cross-sectional diameter from about 0.1 microns to about 100 microns. The minimum diameter in an essentially spherical particle of vulcanized, partially vulcanized, or gum elastomer is effectively the diameter of the particle, since all diameters are effectively the same for an essentially spherical particle; in an elongated fibril particle embodiment, where an (either curvilinear or essentially linear) axis is effectively defined along the length of the fibril particle, the minimum diameter is measured at the narrowest cross-sectional plane perpendicular to the axis. In an essentially oviform particle embodiment where an ellipsoid major axis is effectively defined through the maximum transverse dimension of the oviform particle, the minimum diameter is measured effectively at the minor axis across a cross-sectional plane perpendicular to the major axis at essentially the midpoint of the major axis. In another embodiment, the elastomeric and thermoplastic components are intermixed at elevated temperature in the presence of an additive package in conventional mixing equipment as noted above. Magnetic particulate is then mixed into the polymeric blend until fully dispersed to yield the magnetizable material. In one embodiment, the uncured elastomer component and the thermoplastic polymer and the magnetic particulate are simultaneously mixed with a conventional mixing system such as a roll mill, continuous mixer, a single-screw mixing extruder, a twin-screw extruder mixing extruder, and the like until the uncured elastomer and magnetic particulate materials have been fully mixed.

In a preferred embodiment, plasticizers, extender oils, synthetic processing oils, or combinations thereof may optionally be also used in any of the polymers in this description. Respective to the multiphase composition of the magnetizable polymer, the type of processing oil selected will typically be consistent with that ordinarily used in conjunction with the specific elastomer vulcanizate present in the multiphase composition. The extender oils may include, but are not limited to, aromatic, naphthenic, and paraffinic extender oils. Preferred synthetic processing oils include polylinear-olefins. The extender oils may also include organic esters, alkyl ethers, or combinations thereof. As disclosed in U.S. Pat. No. 5,397,832 entitled "Thermoplastic Elastomer Having Improved Low Temperature Properties," issued Mar. 14, 1995 to Ellul, it has been found that the addition of certain low to medium molecular weight organic esters and alkyl ether esters to the compositional embodiments of this description lowers the $T_g$ in polyolefin and elastomer vulcanizate components, and improves the low temperatures properties of the overall magnetizable materials, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In one particular embodiment, the polymeric binder admixture (blend) is made by admixing from about 80 to about 90 weight percent polyester thermoplastic elastomer with a remainder of uncured elastomer until the uncured elastomer is dispersed to independent particle sizes of not greater than 100 microns in a polymeric binder blend. This polymeric binder is then blended with iron magnetizable particulate so that from about 50 weight percent to about 95 weight percent iron magnetizable particulate is dispersed throughout a remainder of the polymer blend. The material is then formed into an encoder target and the uncured elastomer is then cured with the use of electron beam radiation.

In another particular embodiment, the magnetizable admixture is made by admixing from about 20 to about 50 weight percent fluoroplastic fluoroelastomer vulcanizate (FKM-TPV) with a remainder of uncured fluoroelastomer until the uncured elastomer is dispersed to independent particle sizes of not greater than 100 microns in a polymer blend. This polymer blend is then blended with iron magnetizable particulate so that from about 50 weight percent to about 95 weight percent iron magnetizable particulate is dispersed throughout a remainder of the polymer blend. The material is then formed into an encoder target and the uncured elastomer is then cured with the use of electron beam radiation.

These particular embodiments may include other additives such as stabilizers processing aids, fillers, pigments, adhesives, tackifiers, and waxes in the polymeric blend of the magnetizable material. The properties of blends may be modified, either before or after vulcanization, by the addition of ingredients that are conventional in the compounding of rubber, thermoplastics, and blends thereof as long as the polymeric binder provides the basis for a cured un-magnetizable polymeric binder tangent delta value of not greater than 0.1 as previously described herein.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the polymer in the blend contains about 1 to about 15% by weight processing aids, preferably about 5 to about 10% by weight.

In one embodiment, filler (particulate material contributing to the performance properties of the compounded elastomer gum mixture respective to such properties as, without limitation, bulk, weight, thermal conductivity, electrical conductivity, and/or viscosity while being essentially chemically inert or essentially reactively insignificant respective to chemical reactions within the compounded polymer) is also mixed into the magnetizable material. The filler particulate is any material such as, without limitation, fiberglass, ceramic, or glass microspheres preferably having a mean particle size from about 5 to about 120 microns; carbon nanotubes; or other non-limiting examples of fillers including both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar); and other ground materials such as ground rubber particulate, or polytetrafluoroethylene particulate having a mean particle size from about 5 to about 50 microns; Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and extender oil can improve processability, the resistance to oil swell, heat stability, hysteresis-related properties, cost, and permanent set. In a preferred embodiment, fillers such as carbon black may make up from about 5% to about 40% by weight of the total weight of the polymer prior to addition of the magnetizable particulate.

In one embodiment, a layer of the magnetizable material is cohered to a structural support layer with an adhesive layer to make a multilayer composite having the encoder target as a layer. In one embodiment, curing of the encoder target layer is achieved after multilayer composite precursor assembly by use of irradiation.

In one embodiment, the encoder target layer is cohered directly to a structural support layer through irradiation curing and bonding without benefit of an adhesive layer. A number of considerations in this process are further described in U.S. patent application Publication No. 2006/0003127 (Park) entitled "Electron Beam Curing in a Composite Having a Flow Resistant Adhesive Layer" filed Jun. 30, 2004.

One pultrusion method embodiment provides a method for making a multilayer composite where an adhesive layer is pultruded to a structural core layer (ultimately providing the structural support layer for the multilayer composite) and then the uncured magnetizable layer is pultruded onto the adhesive layer; the set of layers is then irradiated to provide a cured elastomer in the magnetizable layer. An alternative pultrusion method embodiment provides a second method for making a multilayer composite where the uncured magnetizable layer is pultruded directly onto the structural core layer (ultimately providing the structural support layer for the multilayer composite) and the set of layers is then irradiated to provide a cured elastomer in the magnetizable layer and bonding of the magnetizable layer to the structural core layer. In yet another pultrusion method, an elastomer layer is pultruded onto a rigid structural core layer (ultimately providing the structural support layer for the multilayer composite), and the uncured magnetizable layer is pultruded directly onto the elastomer layer. This method is achieved in one embodiment with the use of a two-component pultrusion die where both the elastomeric layer and the uncured magnetizable composition layer are pultruded within one die; in an alternative method embodiment, a first pultrusion die is used to pultrude the elastomeric layer onto the core, the elastomeric layer is cured, and a second pultrusion die is then used to pultrude the uncured magnetizable material layer onto the elastomeric layer. After pultrusion of the uncured magnetizable material layer, the set of layers is then irradiated to provide cured elastomer in the magnetizable layer and optional bonding of the magnetizable layer to either the structural core layer or to the elastomeric layer. Adhesive layers are also optionally pultruded as necessary for interlayer cohesion in the above embodiments.

Any of the above embodiments alternatively treat the multilayer profiled extrudate from the pultrusion die by either (a) curing the multilayer profiled extrudate with radiation (preferably electron beam radiation) and then segmenting the cured multilayer profiled extrudate to provide a finished encoder target multilayer composite or (b) segmenting the multilayer profiled extrudate and then curing at least one of the individual multilayer profiled extrudate segments with radiation (preferably electron beam radiation) to provide a cured encoder target multilayer composite precursor. The cured encoder target multilayer composite precursor is then segmentally magnetized so that an appropriate number of alternating magnetic pole pair portions are provided from magnetic remanence for the desired application.

In various alternative embodiments, the optional adhesive layer comprises fluoroplastic of any of ethylene/chlorotrifluoroethylene copolymer, ethylene/tetrafluoroethylene copolymer, tetrafluoroethylene/hexafluoropropylene copolymer, tetrafluoroethylene/perfluoromethylvinylether copolymer, tetrafluoroethylene/perfluorovinylether copolymer, perfluoroalkoxy/tetrafluoroethylene copolymer, hexafluoropropylene/vinylidene-fluoride copolymer, hexafluoropropylene/chlorotrifluoroethylene copolymer, hexafluoropropylene/vinylidene fluoride copolymer, chlorotrifluoroethylene/vinylidene fluoride copolymer, tetrafluoroethylene/hexafluoropropylene/vinylidene-fluoride terpolymer, polyvinylidene-fluoride, and combinations thereof.

In various alternative embodiments, the adhesive layer comprises liquid fluoroelastomer (solution fluoroelastomer, FKM emulsion latex, or uncured fluoroelastomer that is liquid at room temperature without benefit of solvent or water) when the multilayer composite precursor (the multilayer composite prior to curing of the melt-bonded layer) is assembled. In one embodiment, the liquid fluoroelastomer can be any fluoroelastomer that is liquid at room temperature that, upon curing, will yield any previously-described fluoroelastomer of the amorphous phase of the magnetizable polymer. In an alternative embodiment, the liquid fluoroelastomer may comprise any fluoroelastomer latex (where the latex comprises, in one embodiment, fully cured FKM elastomer; or, in an alternative embodiment, uncured FKM elastomer) that, upon curing and/or drying, will yield any previously-described fluoroelastomer of the amorphous phase of the magnetizable polymer.

The adhesive layer or elastomeric layer (but not the magnetizable layer) may further comprise curing agent (usually a peroxide, bisphenol, polyol, phenol, amine, or combinations of these for a fluoropolymer adhesive) at the time of application to the multilayer composite.

Radiation for curing and/or multilayer composite layer bonding is provided from several alternative radiation sources: any of ultraviolet radiation, infrared radiation, ionizing radiation, electron beam radiation, x-ray radiation, an irradiating plasma, a discharging corona, and combinations of these. A preferred approach is to use electron beam radiation (from about 0.1 MeRAD to about 100 MeRAD, preferably from about 10 MeRAD to about 40 MeRAD, more preferably from about 5 MeRAD to about 20 MeRAD, and most preferably from about 6 MeRAD to about 18 MeRAD). The amount of energy absorbed (the dose) is measured in units of kiloGrays (kGy), where 1 kGy is equal to 1,000 Joules per kilogram, or MegaRads (MR, MeRAD, or Mrad), where 1 MR is equal to 1,000,000 ergs per gram. Electron beam processing is usually effected with an electron accelerator. Individual accelerators are usefully characterized by their energy, power, and type. Low-energy accelerators provide beam energies from about 150 keV to about 2.0 MeV. Medium-energy accelerators provide beam energies from about 2.5 to about 8.0 MeV. High-energy accelerators provide beam energies greater than about 9.0 MeV. Accelerator power is a product of electron energy and beam current. Such powers range from about 5 to about 300 kW. The preferred dosage rate for electron beam treatment is from about 5 to about 20 kGy/second. The main types of accelerators are: electrostatic direct-current (DC), electrodynamic DC, radiofrequency (RF) linear accelerators (LINACS), magnetic-induction LINACs, and continuous-wave (CW) machines.

Figure 6:
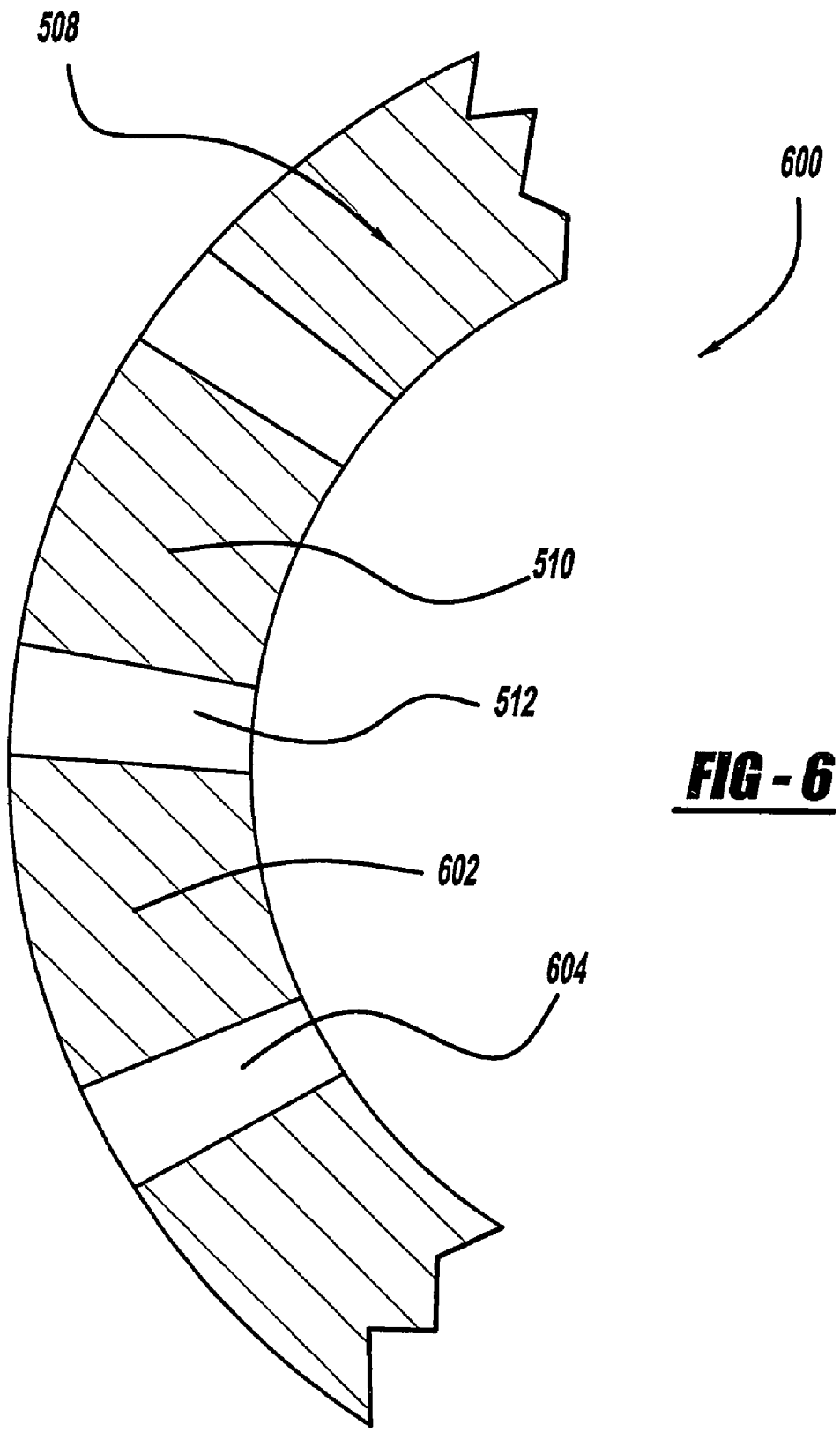
FIG. 6 presents magnetizable segment portion detail in the encoder target wheel of FIG. 5.
Figure 7:
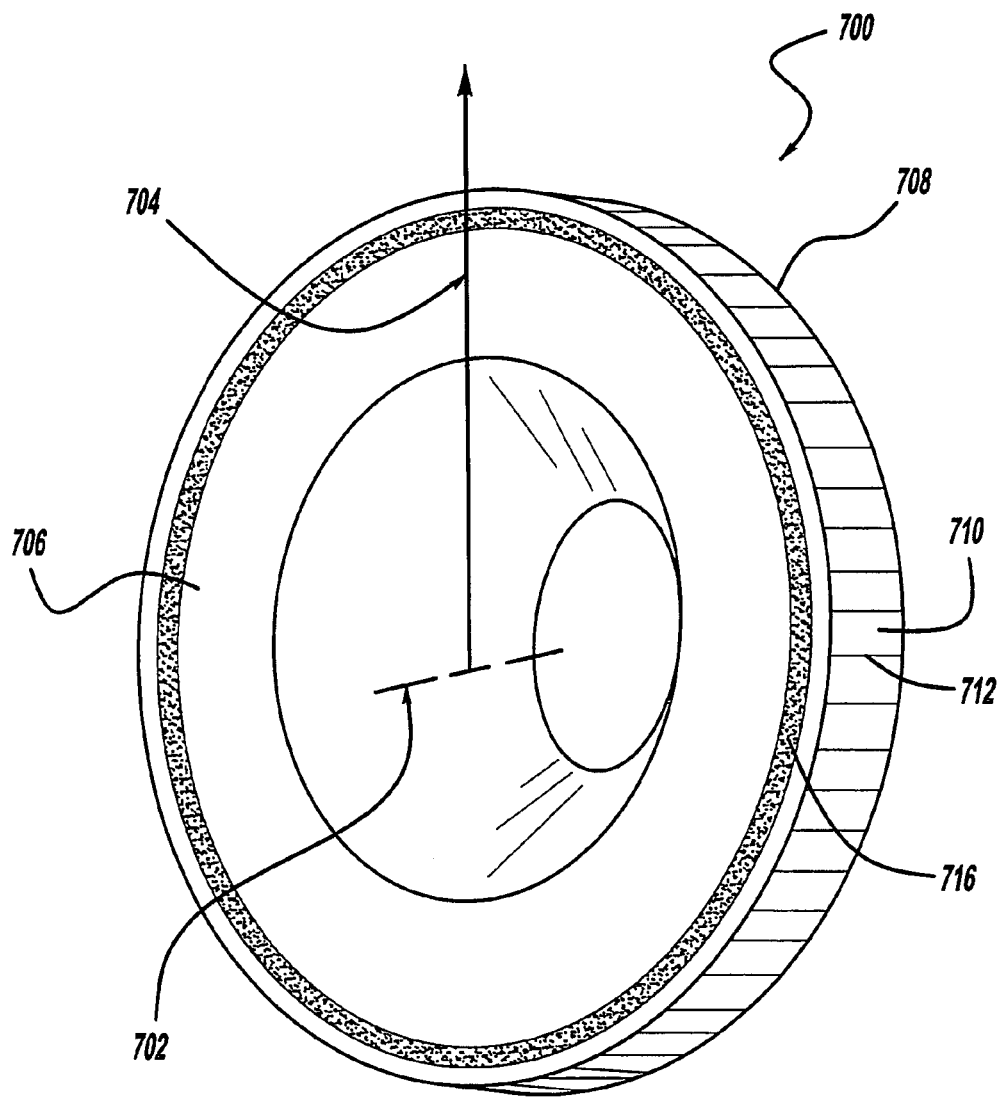
FIG. 7 presents a view of an alternative encoder target wheel embodiment.
Figure 8:
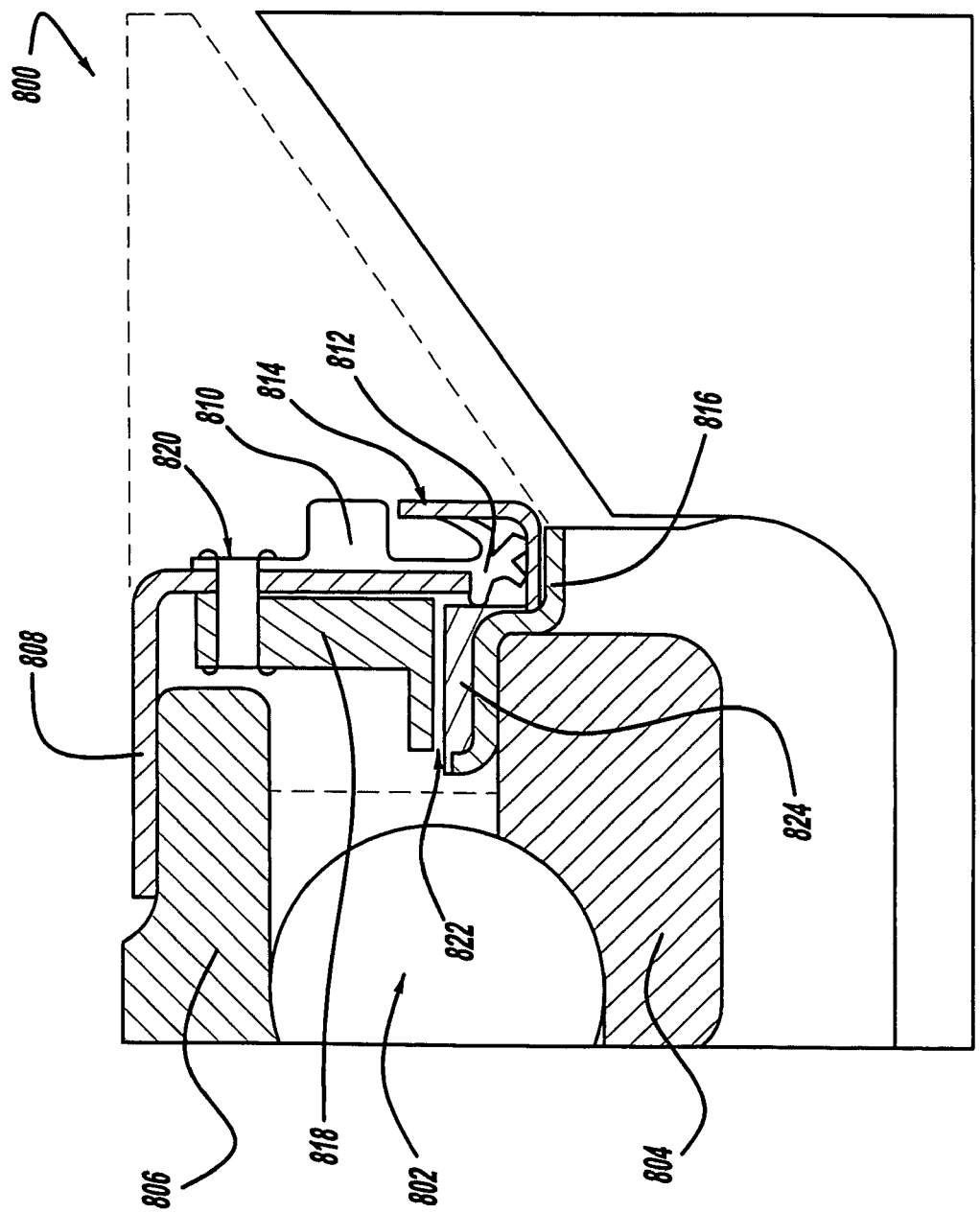
FIG. 8 depicts a cross sectional view of a wheel speed sensing assembly.

FIGS. 5 to 8 present examples of magnetic encoder targets and encoder assemblies that advantageously employ the magnetizable polymer compositional embodiments. Encoder assembly 800, for use in a rotational speed-sensing device, is illustrated in FIG. 8.

Figure 5:
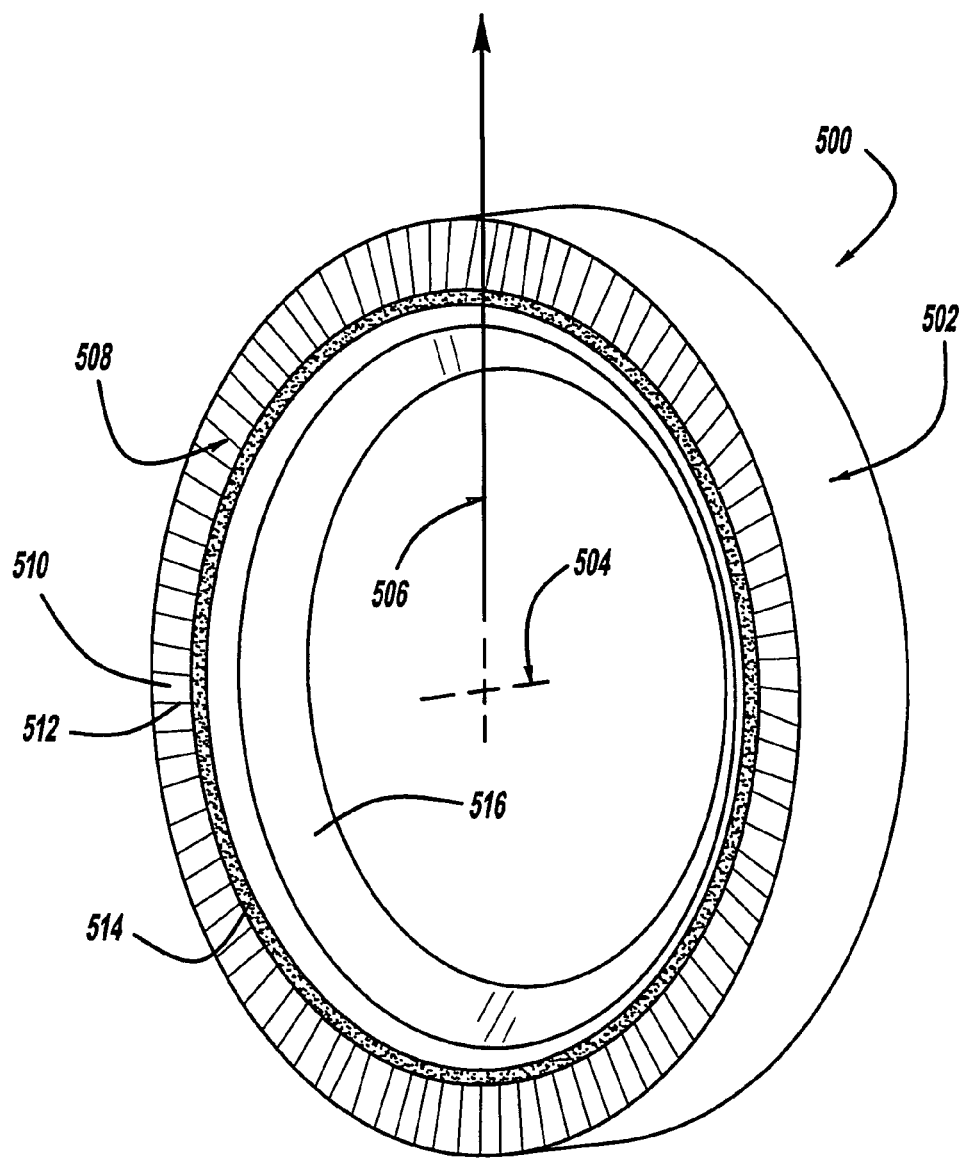
FIG. 5 presents a view of one encoder target wheel embodiment.

FIG. 5 presents a view 500 of an encoder target wheel 502 with an encoder strip (continuous ring 508) in parallel mounting to rotational radius 506 of encoder target wheel base 516. In this regard, encoder target wheel base 516 is designed for rotation around rotational axis 504. Continuous ring 508 comprises cured magnetizable polymer made with polymeric binder having a cured un-magnetizable polymeric binder $\tan\_\delta_{DMTA}$ value less than or equal to 0.1 as further described herein. A series of (first) magnetized portions (such as portion 510) are disposed in alternate sequence with a series of (second) portions (such as portion 512) in continuous ring 508 (the portions are shown with idealized separation lines, for purposes of illustration, in perpendicular orientation to rotational axis 504). While continuous ring 508 is made of continuous cured magnetizable polymer as described above, each first magnetized portion (such as portion 510) has a (first) magnetic field strength that is differentiated from the (second) magnetic field strength of its adjacent second portion(s) (such as portion 512) by not less than about 200 Gauss when the first and second magnetic fields are measured across an air detection gap of about 1 mm. In this regard, the magnetic field strength of each first magnetized portion (such as portion 510) is a remanence from magnetization of that portion. The magnetic field strength of each second magnetized portion (such as portion 512) is, in one embodiment, a remanence from magnetization of that portion that is differentiated from the (first) magnetic field strength of its adjacent first portion(s) (such as portion 510) by not less than about 200 Gauss when the first and second magnetic fields are measured across an air detection gap of about 1 mm. However, in an alternative embodiment, the magnetic field strength of each second magnetized portion (such as portion 512) is essentially zero insofar as each second magnetized portion is an essentially non-magnetized portion; in this alternative embodiment, there is no remanence in the second portion insofar as no magnetic field was ever directly applied to the second portion. A first magnetized portion (such as portion 510) and a second magnetized portion (such as portion 512) provide a magnetic pole pair when arrayed sequentially. In one embodiment, layer 514 derives from a pultrusion core used in pultrusion of ring 508. In this regard, following pultrusion of material for ring 508 onto a pultrusion core, the resulting cylindrically profiled pultrusion extrudate is segmented to provide layer 514 and ring 508 as a cylindrical multilayered composite that is then attached, in one embodiment, to hub 516. In an alternative embodiment, layer 514 and hub 516 are fully unified as a result of pultrusion of material for ring 508 onto a pultrusion core, segmentation of the resulting cylindrically profiled pultrusion extrudate to provide layer 514 in a cylindrical multilayered composite of the segmented portion of the core and layer 514, and further machining of the segmented core, in one embodiment, to provide appropriate surfaces effectively identical to those of hub 516 (see also FIG. 7). In yet another embodiment, layer 514 is an elastomeric layer providing shock absorbency between hub 516 and ring 508.

FIG. 6 presents portion detail 600 for ring 508 in the encoder target wheel assembly 500 of FIG. 5. In this regard, ring 508, portion 510, and portion 512 are reprised for reference. Portion 602 is adjacent to portion 512 and to portion 604. Portions 510 and 602 are (first) magnetized portions disposed in alternate sequence with (second) portions 512 and 604 in continuous ring 508. Portions 510 and 602 have a remanence from magnetization that is differentiated from the magnetic field strength of portions 512 and 604 by not less than about 200 Gauss (with the note that the magnetic field strength of either or both of portions 512 and 604 has, in one embodiment, a value of zero) when the first and second magnetic fields are measured across an air detection gap of about 1 mm.

Respective to the amount of magnetizable particulate essentially continuously present throughout all of portions 510, 512, 602, and 604, it is to be appreciated that excessive particulate in the cured admixture of ring 508 either frustrates flexibility and/or robustness by rendering cured ring 508 (derived from the admixture) too brittle or frustrates the ability to segment portions magnetically (selectively magnetize portions 510 and 602 of into differentiated remanence from the magnetic fields of portions 512 and 604) by creating an effective continuum of magnetizable material where the individual particles cannot be independently magnetized. Sufficient particulate must be admixed into ring 508 so that the cured polymer of ring 508 provides sufficient remanence in portions 510 and 602, after a magnetizing field has been applied to portions 510 and 602, so that a reasonable sensor (positioned within a reasonable distance of ring 508 of, for example 1 mm) responds to the higher remanence when portions 510 and 602 pass by the sensor and also responds to the lower remanence (or lack of magnetic field in one embodiment) portions 512 and 604 such that the magnetic fields of portions 510 and 602 are sensed as differentiated from the magnetic fields of portions 512 and 604. One aspect of this utility is that there is an inherent interrelationship between the amount of magnetizable particulate in the cured admixture of ring 508, the sensitivity of the sensor, the gap between the sensor, and the size (portional mass) of any of portions 510, 512, 602, and 604. In this regard, a cured block of the admixture of ring 508 with a length of about 1 centimeter, a width of about 1 centimeter, and a thickness of about 50 millimeters is useful for providing a sufficient volume of material to approximate a combination of portion 510 and portion 512, a combination of portion 512 and portion 602, or a combination of portion 602 and portion 604.

FIG. 7 presents a view of an encoder target wheel 700 with an encoder strip 708 in perpendicular mounting to rotational radius 704 of target wheel base 706. Layer 716 is provided and functions in a similar manner as layer 514 in FIG. 5. Strip 708 is mounted on the circumference of target wheel 706. In this regard, encoder target wheel base 706 is designed for rotation around rotational axis 702. Continuous ring 708 comprises cured magnetizable polymer having a polymeric binder that demonstrates an independently radiation cured tan_$\delta_{DMTA}$ value less than or equal to 0.1 as further described herein. A series (ideally-illustrated) of (first) magnetized portions (such as portion 710) are disposed in alternate sequence with a series of (second) portions (such as portion 712) in continuous ring 708 (the portions are shown with idealized separation lines for purposes of illustration in parallel orientation to rotational axis 704). While continuous ring 708 is made of continuous cured magnetizable polymer as described above, each first magnetized portion (such as portion 710) has a (first) magnetic field strength that is differentiated from the (second) magnetic field strength of its adjacent second portion(s) (such as portion 712) by not less than about 200 Gauss when the first and second magnetic fields are measured across an air detection gap of about 1 mm. As should be apparent, other details in assembly 700 significantly parallel and are readily apparent from a consideration of detailed considerations respective to FIGS. 5 and 6. In summary, FIG. 5 and FIG. 7 show two different embodiments of encoder strips (encoder targets) on target wheels. A sensor (not shown in FIG. 5 or FIG. 7) can be positioned in one embodiment to sense the magnetic remnance of the encoder target across a gap respective to the parallel surface of the encoder target to the rotational axis (a surface such as indicated at the end of drawing indicator 710). In an alternative embodiment a sensor (not shown in FIG. 5 or FIG. 7) can be positioned to sense the magnetic remnance of the encoder target across a gap respective to the perpendicular surface of the encoder target to the rotational axis (a surface such as indicated at the end of drawing indicator 510).

The use of an encoder is more completely appreciated from FIG. 8 as it sets forth a cross sectional view of wheel speed sensing assembly 800 for using an encoder on a target wheel assembly to measure rotation of a wheel. Bearing 802 is positioned between upper bearing housing 806 and lower bearing housing 804, with bearing 802 capable of rotation between housing 806 and housing 804 so that a wheel connected to housing 804 rotates to convey a non-rotating assembly (such as a automotive chassis) connected to upper housing 806 and so that bearing 802 interfaces the weight of the non-rotating assembly to the wheel. In assembly 800, the wheel speed sensing system is efficiently integrated into the wheel's bearing system. In this regard, bearing housing 806 is connected to shaft seal housing 808 which provides shroud protection from dust, moisture, and debris to both bearing 802 and to the bearing rolling surfaces of housing 806 and housing 804; housing 808 also supports sensor 818 in a position to measure magnetic field flux from encoder target 824. Encoder target 824 is mounted upon bearing seal 816. Dust cover 814 is also compressively held tightly against bearing seal 816. Lip seal 810 is held tightly against the outboard surface of shaft seal housing 808 with grommet 820, and sensor 818 is also held tightly (in a position to measure magnetic field flux from encoder 824) against the inboard surface of shaft seal housing 808 with grommet 820. Lip seal 810 has a lower star portion 812 that has four flexible flanges ("lips") that appear in the cross-sectional view of FIG. 8 as a set of four prongs forming an irregular "star" in star portion 812. One of the lip seals (one of the prongs) of the "star" bears flexibly and slidably against the vertical portion (as depicted in FIG. 8) of dust cover 814, the next two clockwise-disposed lip seals of the "star" bear flexibly and slidably against two separate points of the lower horizontal portion (as depicted in FIG. 8) of dust cover 814, and the remaining fourth lip seal bears non-slidably against both the lower end of housing 808 and flexibly and slidably against an edge of encoder 824. Insofar as the four lips (prongs) of lip seal 810 have edges bearing on all inboard sides of a "U" formed by the vertical and horizontal portions of dust cover 812 and by an edge of encoder 824, a degree of labyrinthine seal protection is afforded to gap 822 (between sensor 818 and encoder 824), bearing 802, and the bearing rolling surfaces of housing 806 and housing 804 against dust, moisture, and debris. Gap 822 separates sensor 818 and encoder 824 with a space that is sufficiently small so that a series of (first) magnetized portions (such as portion 710 of FIG. 7) disposed in alternate sequence with a series of (second) portions (such as portion 712 in FIG. 7) in encoder 824 target are differentially sensed as they pass sensor 818. As should be appreciated, the individual lips seals of star portion 812 abrade slightly in operation to ultimately slidably interface in very close tolerance to the non-flexible surfaces against which they slide.

When viewed in lateral cross section (not shown, but which should be apparent) perpendicular to the cross section of FIG. 8, encoder target 824 provides a set of portions of sequentially disposed alternative magnetic fields arranged essentially according to the portions of encoder strip 808. In operation, encoder target 824 rotates past sensor 818, and sensor 818 responds to the differentiated magnetic fields to generate a signal indicative of the rate of rotation of housing 804.

Encoder 824 comprises cured magnetizable polymer made with polymeric binder having a cured un-magnetizable polymeric binder tan_$\delta_{DMTA}$ value less than or equal to 0.1 as further described herein. Prior to use, (first) portions of encoder 824 are magnetized to provide a remanence for sensing by sensor 818. These (first) portions having remanence are alternately disposed in with (second) portions of encoder 824 that either have no remanence or that have a remanence that is sensed by sensor 818 across gap 822 as magnetic fields of clearly differentiated remanence from the (first) magnetized portions as encoder 824 rotates past sensor 818.

Figure 9:
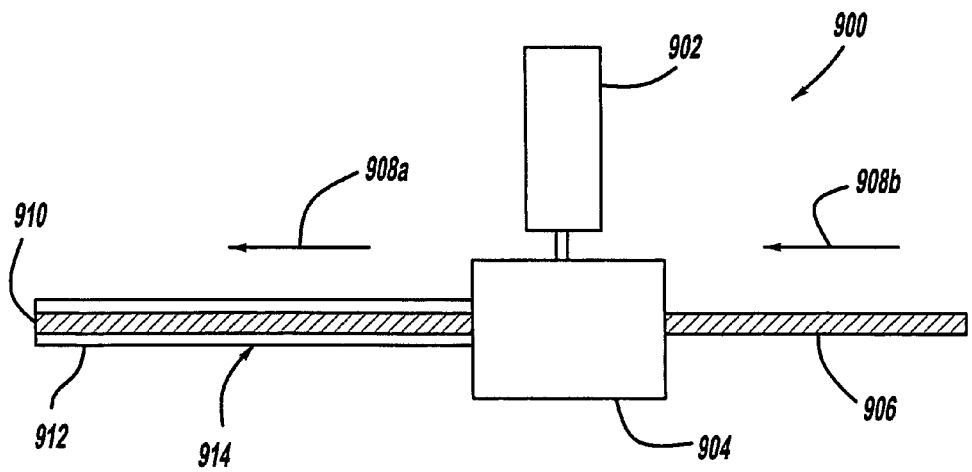
FIG. 9 depicts a pultrusion process.

Turning now to FIG. 9, a preferred pultrusion process embodiment 900 for making profiled pultrusion extrudate for an encoder target is illustrated. Pultrusion is similar to extrusion except that the polymer fluid is deposited on solid pipe (or other continuous pulling device) to form coated pipe; in this regard, the polymeric fluid is forced through the die and also "pulled" (as solid pipe is independently driven through the die and exit aperture of the die) onto the solid piper per surface tension between the fluid polymer and the exterior surface of the solid pipe. In FIG. 9, pipe 906 is propelled into pultrusion die 904 along the direction indicated by vector 908$a$ and 908$b$ to provide a core or mandrel in the pultrusion. Pre-cured (uncured) magnetizable polymer, formulated according to one of the magnetizable polymer blend embodiments further described herein, is also extruded from extruder 902 into pultrusion die 904. Profiled extrudate 914 is then continuously discharged from pultrusion die 904 as a continuous cylindrical multilayered composite having an inner layer 910 (derived from pipe 906) and an exterior layer 914 of the pre-cured (uncured) magnetizable polymer. In one embodiment, an electron beam irradiation system (not shown) then cures the pre-cured (uncured) magnetizable polymer into magnetizable polymer and the cured profiled extrudate is segmented as shown, in one embodiment, in FIG. 10. In an alternative process embodiment, profiled extrudate 914 is segmented as shown, in one embodiment, in FIG. 10; and an electron beam irradiation system (not shown) then cures at least one segment to convert the pre-cured (uncured) magnetizable polymer layer of the segment into a magnetizable polymer layer.

Figure 10:
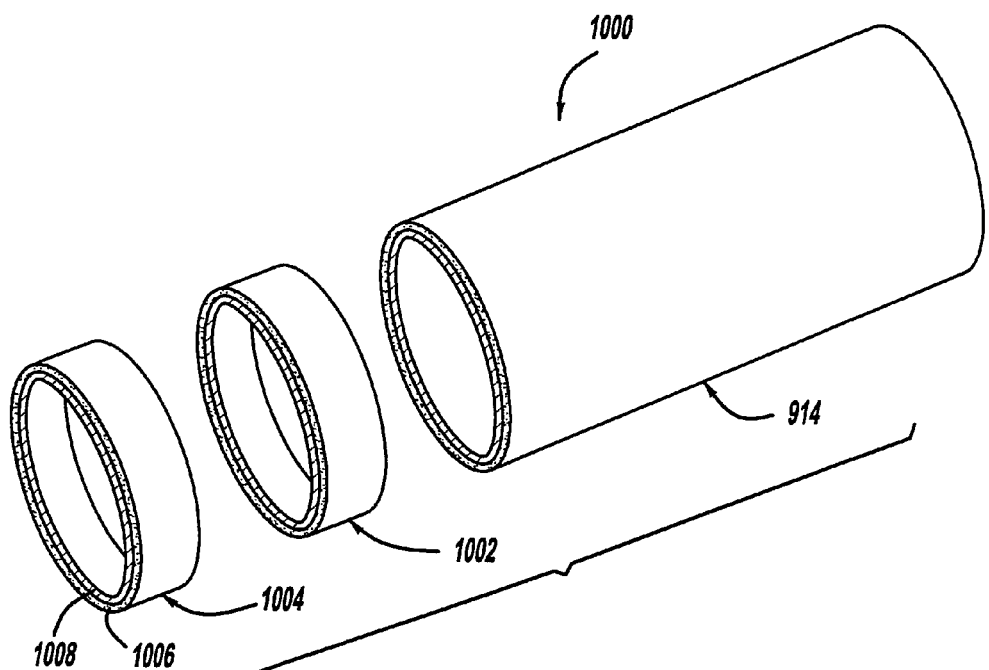
FIG. 10 depicts segmentation of profiled extrudate.

Turning now to FIG. 10, the segmentation of (reprised) profiled extrudate 914 into segment 1002 and segment 1004 is depicted. Segment 1004 detail includes inner layer 1008 derived from inner layer 910 (as earlier derived from pipe 906) and outer layer 1006 of magnetizable polymer as derived from exterior layer 914.

In one process embodiment, a mandrel (pipe 906) is made, the magnetizable polymer is pultruded onto the mandrel, and the mandrel is removed to leave a magnetizable polymer ring article.

In one embodiment of this, a mandrel is extruded and cooled in a water bath in a vacuum sizing system to define the inner dimension of a desired tube. A pultrusion is then performed using the mandrel as a pultrusion core component. In the pultrusion, the uncured magnetizable polymer is pultruded onto the mandrel. The resultant 2-layer pultruded tube is air cooled to solidify the magnetizable polymer layer pultruded onto the mandrel. The cooled 2-layer tube is then irradiated on the outer surface with electron beam radiation to cure the magnetizable polymer. The mandrel is then removed from the 2-layer tube to provide a residual magnetizable polymer ring article.

In yet another pultrusion embodiment, an adhesive layer is pultruded on the pultrusion core and the uncured magnetizable polymer is pultruded onto the adhesive so that a three layer multilayer profiled extrudate is provided for segmentation.

Some encoder target embodiments are made through the process of transfer molding. In a first step of this, a quantity of uncured magnetizable material (as further described herein) is placed into an entry chamber of a mold. The mold is closed and the quantity of uncured magnetizable material is forced by hydraulic pressure (usually through use of a plunger) into the mold cavity. The molded uncured magnetizable material then solidified in the mold cavity under pressure so that the shape of the molded part is stabilized. The plunger is then released, the mold is opened, and the precursor part can be removed. In one method embodiment, useful for a multilayer composite target article, a first transfer molding of a structural layer for a multilayer composite encoder target is made and cooled in a mold having a first cavity plate and a second cavity plate. The second cavity plate is removed and a third cavity plate then positioned on the first cavity plate (containing the first layer of the encoder target) to provide a cavity for a second transfer molding of a second material such as the magnetizable material described herein. The second layer (in one embodiment, an adhesive layer) of the multilayer composite encoder target is then transfer molded onto the first layer. The process is repeated with cavity plates providing additionally sized cavities until the multilayer composite encoder target has been fully formed. The formed multilayer composite is then treated with electron beam radiation to provide the finished multilayer composite encoder target.

Insert molding is used for making multilayer composites having an encapsulated layer. The layer to be encapsulated (magnetizable polymer according to this description) is first made, for example, by injection molding. The layer to be encapsulated is then placed as an insert core into a mold cavity for the insert molding procedure. Structural polymer for the multilayer composite is then injected into the mold cavity around the insert core of magnetizable polymer. The multilayer composite is then cured with electron beam radiation. The resulting cured multilayer composite has an encapsulated core layer of the magnetizable polymer.

The multilayer composites are therefore made by a number of established processes including any of pultrusion, compression molding, multi-layer extrusion, injection molding, transfer molding, and insert molding.

Figure 11A:
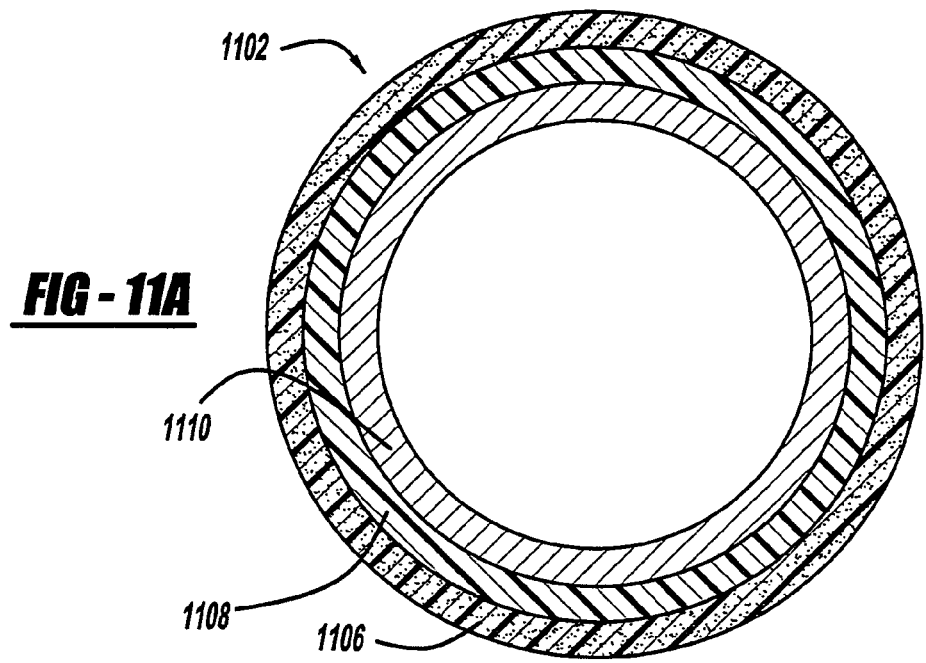
FIG. 11A presents a simplified cross-section of a three layer multilayer composite.
Figure 11B:
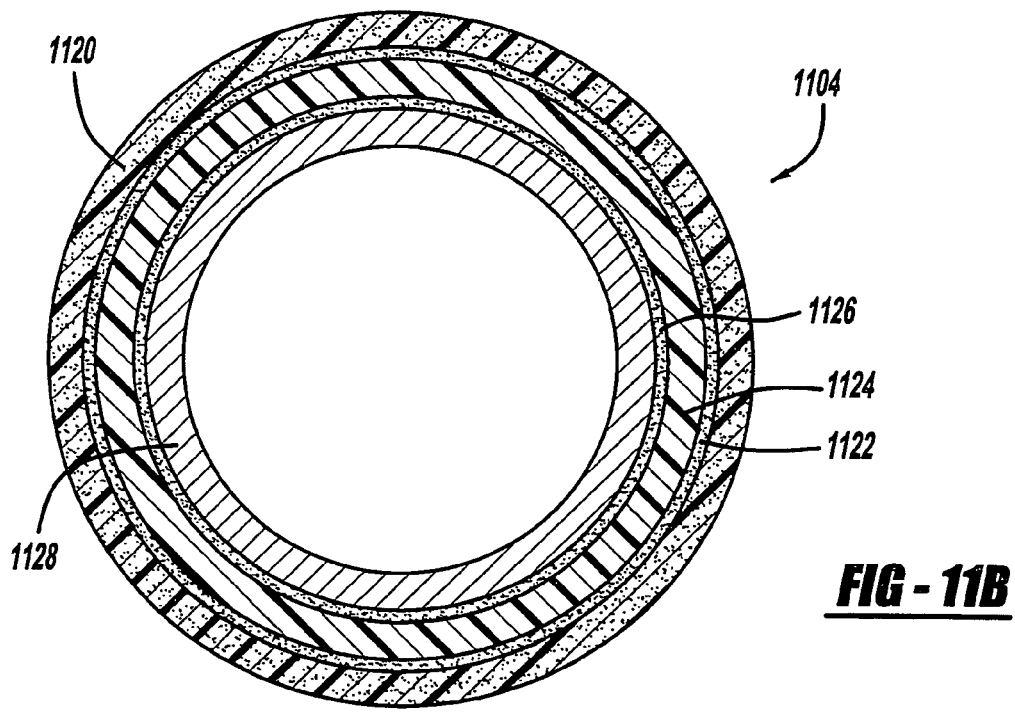
FIG. 11B presents a simplified cross-section of a five layer multilayer composite.

Turning now to further details in multilayer composite embodiments, FIG. 11A presents simplified cross-section 1102 of a three layer multilayer composite and FIG. 11B presents simplified cross-section 1104 of a five layer multilayer composite for multilayer composite embodiments having an encoder target layer. In this regard, cross-section 1102 and cross-section 1104 represent cross-sections of either cylindrically profiled extrudate, cylindrical segmented extrudate, or a finally-cured cylindrically multilayer composite having an encoder target as described above.

In simplified cross-section 1102 of a three layer multilayer composite in FIG. 11A, encoder target layer 1106 comprises magnetizable material according to the above compositional embodiments. Encoder target layer 1106 is directly cohered (bonded) to elastic layer 1108. Elastic layer 1108 comprises, without limitation in various embodiments, an elastomer such as fluoroelastomer (FKM), polyacrylate elastomer (ACM), ethylene acrylic elastomer (AEM), nitrile butyl rubber elastomer (NRB), hydrogenated nitrile butyl rubber elastomer (HNBR), polyurethane elastomer (PU), silicone elastomer, ethylene propylene diene monomer elastomer (EPDM), natural rubber elastomer, polyethylene-vinyl acetate elastomer (EVA), styrene-butadiene rubber (SBR), natural rubber, and combinations thereof. Elastic layer 1108 is directly cohered (bonded) to rigid layer 1110. Rigid layer 1110 comprises, without limitation, a structural material such as steel, a rigid plastic, or ceramic. In a cured multilayer composite having cross section 1102, elastic layer 1108 has a type A ("Shore A") Durometer Hardness from about 5 to about 90 according to ASTM test method D 2240-97. Rigid layer 1110 has a type D ("Shore D") Durometer Hardness of not less than 5 according to the same ASTM test method. Encoder target layer 1106 is formulated and cured as described above and has a type D ("Shore D") Durometer Hardness of from about 5 to about 90 according to the same ASTM test method. Encoder target layer 1106 has a radial thickness of from about 0.25 to about 5 millimeters. Elastic layer 1108 has a radial thickness of from about 0.25 to about 2.5 millimeters. The multilayer composite having cross section 1102 is made without benefit of adhesive layers and is bonded preferably by use of electron beam radiation as further described in U.S. patent application Publication No. 2006/0004142 (Park) entitled "Electron Beam Inter-Curing in a Composite Having a Flow Resistant Adhesive Layer" filed Jun. 30, 2004.

In simplified cross-section 1104 of a five layer multilayer composite of FIG. 11B, encoder target layer 1120 comprises magnetizable material according to the above compositional embodiments. Encoder target layer 1124 is cohered (bonded) to elastic layer 1124 with benefit of adhesive layer 1122. Elastic layer 1124 comprises, without limitation in various embodiments, an elastomer such as described for elastic layer 1108. Elastic layer 1124 is cohered (bonded) to rigid layer 1128 with benefit of adhesive layer 1126. Rigid layer 1124 comprises, without limitation, a structural material such as steel, a rigid plastic, or ceramic. In a cured multilayer composite having cross section 1104, elastic layer 1124 has a type A ("Shore A") Durometer Hardness from about 5 to about 90 according to ASTM test method D 2240-97. Rigid layer 1128 has a type D ("Shore D") Durometer Hardness of not less than 5 according to the same ASTM test method. Encoder target layer 1120 is formulated and cured as described above and has a type D ("Shore D") Durometer Hardness of from about 5 to about 90 according to the same ASTM test method. Encoder target layer 1120 has a radial thickness of from about 0.25 to about 5 millimeters. Elastic layer 1124 has a radial thickness of from about 0.25 to about 2.5 millimeters. The multilayer composite having cross section 1102 is made with benefit of adhesive layers 1122 and 1126 and is optionally further bonded preferably by use of electron beam radiation as further described in U.S. patent application Publication No. 2006/0004142 entitled "Electron Beam Inter-Curing in a Composite Having a Flow Resistant Adhesive Layer" published Jan. 5, 2006.

In making multilayer composites having cross sections according to either cross section 1102 or cross section 1104, profiled extrudate is preferably generated as an interim structure as further described herein. In this regard, the multilayer composites can be alternatively made by use of co-extrusion, co-pultrusion, or segmented pultrusion. In co-extrusion, all layers are generated in one unified die and the layers solidify as a unified system. In co-pultrusion, the core layer (such as rigid layer 1110 or rigid layer 1128) for the pultrusion is solidified independently prior to pultrusion, but all other layers of the multilayer composite are generated in one unified die and the pultruded layers solidify as a unified system. In segmented pultrusion, the core layer (such as rigid layer 1110 or rigid layer 1128) for the pultrusion is solidified independently prior to pultrusion, and a first layer (such as elastic layer 1108) is first pultruded onto the core layer and solidified. Then the next layer (such as encoder target layer 1106 is pultruded onto the new "multilayer core layer" (such as provided by solidified elastic layer 1108 on rigid layer 1110). As can be appreciated, a multilayer composite having cross section 1104 is therefore made with 4 separate pultrusion operations if a fully segmented pultrusion method embodiment is used. If a rigid plastic core provides a rigid layer such as rigid layer 1110 or rigid layer 1128, a multilayer composite embodiment can alternatively be made using any of segmented pultrusion, co-pultrusion, or coextrusion. If a ceramic or metal core provides a rigid layer such as rigid layer 1110 or rigid layer 1128, a multilayer composite embodiment can alternatively be made using either segmented pultrusion or co-pultrusion. In some embodiments, another method such as any of previously described over-molding (compression molding or injection molding) or bi-material molding is, without limitation, used to make a multilayer composite.

The composition and methods of this technology are further described by the following non-limiting examples.

Example 1

In a batch process for making a processable pre-cured magnetizable material, a Banbury batch mixer (or, alternatively, a Moriyama mixer, or a Brabender with an internal mixing attachment can be substituted) is loaded with Pebax MX 1205 thermoplastic elastomer (having a melting point of about 150° C.) and un-cured FKM elastomer gum (alternatively, uncured Tecnoflon P457 elastomer gum) is loaded into the mixer. Temperature in the mixer is adjusted to about 190° C. to melt the thermoplastic elastomer and achieve a viscosity for admixing and/or interblending of the elastomer and thermoplastic elastomer (TPE). The heated TPE/elastomer polymeric blend is stirred for from about 10 to about 15 minutes until a uniform polymeric blend of the thermoplastic elastomer and elastomer is obtained. Magnetizable HM170i ferrite powder (commercially available from Hoosier Magnetics, Inc.) is then added slowly to the TPE/elastomer blend while sustaining the mixing operation. The TPE/elastomer/ferrite-powder blend is then continuously mixed, after all of the ferrite powder has been added, for from about 10 to about 15 minutes at a rotor speed of about 50 rpm. Mixing continues until a the ferrite powder has been fully dispersed and the elastomer gum has been fully intermixed to a desired particle or portional granularity, as determined for example by reaching a steady state torque reading in the mixer for a given period of time respective to the overall amount of material being mixed. The pre-cured magnetizable composition is then discharged from the batch mixer and granulated to make small size pellets for use in subsequent fabrication processes, such as pultrusion extrusion, infection molding, compression molding, transfer molding, blow molding, single layer extrusion, multi-layer extrusion, insert molding, and the like. The procured material may also be formed into plaques for the measurement of physical properties.

Example 2

A twin-screw extruder with co-rotating screws is used for continuous manufacture of a pre-cured magnetizable material. The extruder barrel is heated to 190° C. and pellets of thermoplastic elastomer (e.g. Pebax MX 1205, with a melting point of about 150° C.) are added to the first extruder hopper along the forward direction of the material flow vector in the twin-screw extruder. The thermoplastic elastomer pellets are melted in the melting zone of the extruder barrel, compressed in the compression zone, and transferred into the first mixing zone of the extruder. Pelletized FKM elastomer gum/oligomer (alternatively, pelletized Tecnoflon P457 elastomer gum/oligomer gum) is fed into the barrel from a first side feeding zone hopper, which is positioned downstream of the first mixing zone along the forward direction of the material flow vector in the twin-screw extruder. The elastomer pellets are melted in the barrel and mixed with the molten thermoplastic elastomer as the screws are rotated to drive the polymeric blend of molten thermoplastic elastomer and elastomer into the second mixing zone. Magnetizable HM170i ferrite powder (commercially available from Hoosier Magnetics, Inc.) is added at a second side-feeding zone positioned downstream of the second mixing zone (along the forward direction of the material flow vector in the twin-screw extruder). Screw rotation rates (from about 150 to about 200 rpm) are adjusted to achieve a residence time from about 10 to about 15 minutes in the barrel. Temperature in the extruder barrel is maintained at about 190° C. The magnetizable blend of ferrite powder in the polymeric blend (thermoplastic elastomer and elastomer) is extruded from the second mixing zone through a 1-3 mm diameter strand die and is quenched by cooling in a water bath before passing through a stand pelletizer. The procured magnetizable composition is granulated in the pelletizer to make small size pellets for use in subsequent fabrication processes, such as pultrusion extrusion, infection molding, compression molding, transfer molding, blow molding, single layer extrusion, multi-layer extrusion, insert molding, and the like. The material may also be formed into plaques for the measurement of physical properties.

Example 3

An encoder target is made by melting pellets of pre-cured magnetizable material (made according to either Example 1 or Example 2) in an extruder heated to about 190° C. attached to a pultrusion die. The molten magnetizable material is discharged from the extruder through a crosshead pultrusion die heated to about 190° C. onto a steel pipe. The pultrusion die forms the molten magnetizable material into a shaped polymer coating on the pipe by discharging the pipe with shaped polymer coating through an exit aperture as a multilayered composite profiled extrudate. The multilayer profiled extrudate composite is then cooled in a water bath to solidify the shaped pre-cured magnetizable material coating. The cooled multilayer profiled extrudate composite is then cured by exposure to electron beam radiation (0.1 through 100 MeRAD dosages, preferably from about 0.1 MeRAD to about 100 MeRAD, more preferably from about 5 MeRAD to about 20 MeRAD, and most preferably from about 6 MeRAD to about 18 MeRAD). The cured multilayer profiled extrudate composite is then cut in a plane perpendicular to the elongation axis along the centerline of the pipe to segment the cured multilayer profiled extrudate composite into a set of cured encoder target precursors. Each cured encoder target precursor is then independently exposed to a magnetizing field to provide a plurality of magnetized portions (e.g. to achieve 16 through 128 pole pairs) in the cured encoder target precursor with each portion of said plurality of positioned at a unique angular location polar in relation to the center-point (the intersection of the elongation axis of the pipe centerline with the perpendicular cutting axis used to make the encoder target precursor) of the encoder target. Magnetization is controlled so that each pole pair in the encoder target provides a first magnetic field in a first portion and an adjacent second magnetic field in a second portion that is differentiated in magnetic field strength from the first portion by not less than 200 Gauss when measured across an air detection gap of about 1 mm.

Example 4

A set of formulations of thermoplastic elastomer, elastomer (TPU, ACM, or FKM), and HM170i ferrite powder are prepared according to the method of Example 1 and formulations of Table 1 in a Brabender Batch Mixer.

Ingredients in Table 1 formulations: Hytrel® HTR 8425 (polyester/polyether TPE); Vamac® GLS (AEM—ethylene acrylic elastomer); Noxtite® PA-402 (ACM—polyacrylate elastomer); Ferrite® HM170i (ferrite powder); Pebax® MX1205 (polyamide/polyether TPE); Disogrin® 9250 (TPU elastomer); and Technoflon® P457 (FKM elastomer).

The examples and other embodiments described herein are exemplary and not intended to be limiting in describing the full scope of compositions and methods of this description. Equivalent changes, modifications and variations of specific embodiments, materials, compositions and methods may be made within the scope of the present disclosure, with substantially similar results.

What is claimed is:

1. A magnetizable material comprising magnetizable particulate dispersed throughout polymeric binder, the polymeric binder having the composition comprising:
   (a) uncured elastomer dispersed in thermoplastic; wherein
   (b) the composition is radiation curable to provide cured polymer having a dynamic mechanical thermal analyzer tangent delta value not greater than 0.1 at a temperature not less than the liquefaction supra point temperature of the thermoplastic;
   wherein the magnetizable particulate comprises at least one element selected from the group consisting of iron, rare earth metals, and combinations thereof.

2. The magnetizable material of claim 1 wherein the polymeric binder composition is essentially devoid of curing agent for the uncured elastomer.

3. The magnetizable material of claim 1 wherein the thermoplastic is selected from the group consisting of thermoplastic elastomer, thermoplastic vulcanizate, and a combination thereof.

4. The magnetizable material of claim 3 wherein the thermoplastic consists essentially of thermoplastic elastomer, and the thermoplastic comprises from about 1 weight percent to about 99 weight percent of the composition.

TABLE 1

Pre-cured Magnetizable Material Formulations
(components in weight parts per hundred)

| # | Hytrel® TPE | Pebax® TPE | Vamac® AEM elastomer | Noxtite® ACM elastomer | Disogrin® TPU elastomer | Technoflon® FKM elastomer | Ferrite® powder |
|---|---|---|---|---|---|---|---|
| 1 | 19.0 | | 1.0 | | | | 80.0 |
| 2 | 17.5 | | 2.5 | | | | 80.0 |
| 3 | 15.0 | | 5.0 | | | | 80.0 |
| 4 | 19.0 | | | 1.0 | | | 80.0 |
| 5 | 17.5 | | | 2.5 | | | 80.0 |
| 6 | | 19.0 | | | 1.0 | | 80.0 |
| 7 | | 17.5 | | | 2.5 | | 80.0 |
| 8 | | 15.0 | | | 5.0 | | 80.0 |
| 9 | | 19.0 | 1.0 | | | | 80.0 |
| 10 | | 17.5 | 2.5 | | | | 80.0 |
| 11 | | 19.0 | | | | 1.0 | 80.0 |
| 12 | | 17.5 | | | | 2.5 | 80.0 |
| 13 | | 15.0 | | | | 5.0 | 80.0 |
| 14 | 14.0 | | 1.0 | | | | 85.0 |
| 15 | 12.5 | | 2.5 | | | | 85.0 |
| 16 | 10.0 | | 5.0 | | | | 85.0 |
| 17 | 14.0 | | | 1.0 | | | 85.0 |
| 18 | 12.5 | | | 2.5 | | | 85.0 |
| 19 | | 14.0 | | | 1.0 | | 85.0 |
| 20 | | 12.5 | | | 2.5 | | 85.0 |
| 21 | | 10.0 | | | 5.0 | | 85.0 |
| 22 | | 14.0 | 1.0 | | | | 85.0 |
| 23 | | 12.5 | 2.5 | | | | 85.0 |
| 24 | | 14.0 | | | | 1.0 | 85.0 |
| 25 | | 12.5 | | | | 2.5 | 85.0 |
| 26 | | 10.0 | | | | 5.0 | 85.0 |

5. The magnetizable material of claim 3 wherein the thermoplastic consists essentially of thermoplastic vulcanizate, and the thermoplastic vulcanizate comprises from about 1 weight percent to about 50 weight percent of the composition.

6. The magnetizable material of claim 1 wherein the magnetizable particulate consists essentially of a ferrite material, and the magnetizable particulate comprises from about 70 weight percent to about 95 weight percent of the composition.

7. The magnetizable material of claim 1 wherein the magnetizable particulate consists essentially of a rare earth metal material, and the magnetizable particulate comprises from about 15 weight percent to about 50 weight percent of the composition.

8. The magnetizable material of claim 1 wherein the magnetizable particulate comprises particles, each of essentially all of the particles is independently not greater than 1000 microns minimum essential diameter, and each of at least 50% of the particles is independently not greater than 100 microns minimum essential diameter.

9. A magnetizable composition, comprising:
(a) magnetizable particulate dispersed throughout cured polymeric binder; wherein
(b) the magnetizable composition is segmentally magnetizable such that a first magnetic field in a first portion in a block of said composition is differentiated from a second magnetic field in a second portion of said block by not less than 200 Gauss when measured across an air detection gap of about 1 mm wherein said block has a length of about 1 centimeter, a width of about 1 centimeter, and a thickness of about 50 millimeters;
(c) the cured polymeric binder is made by radiation curing a dispersion of uncured elastomer in thermoplastic; and
(d) the polymeric binder, if radiation cured without dispersing any of the magnetizable particulate therein, would have a dynamic mechanical thermal analyzer tangent delta value not greater than 0.1 at a temperature not less than the liquefaction supra point temperature of the thermoplastic.

10. The composition of claim 9 wherein the thermoplastic comprises thermoplastic elastomer.

11. The composition of claim 10 wherein the thermoplastic consists essentially of thermoplastic elastomer, and the thermoplastic comprises from about 1 weight percent to about 99 weight percent of polymer in the polymeric binder.

12. The composition of claim 9 wherein the magnetizable particulate comprises at least one element selected from the group consisting of iron, rare earth metals, and combinations thereof.

13. The composition of claim 12 wherein the magnetizable particulate consists essentially of a ferrite material, and the magnetizable particulate comprises from about 70 weight percent to about 95 weight percent of the composition.

14. The composition of claim 12 wherein the magnetizable particulate consists essentially of a rare earth metal material, and the magnetizable particulate comprises from about 15 weight percent to about 50 weight percent of the composition.

15. The composition of claim 9 wherein the magnetizable particulate comprises particles, each of essentially all of the particles is independently not greater than 1000 microns minimum essential diameter, and each of at least 50% of the particles is independently not greater than 100 microns minimum essential diameter.

16. The composition of claim 9 wherein elastomer in the cured polymeric binder comprises particles and each of essentially all of the particles of elastomer is independently not greater than 100 microns minimum essential diameter.

17. An encoder target precursor, comprising:
(a) formed material of magnetizable particulate dispersed throughout a polymeric binder; wherein
(b) the formed material is configured to provide an encoder target after curing of the formed material;
(c) the polymeric binder comprises uncured elastomer dispersed in thermoplastic;
(d) the polymeric binder, if cured with radiation without dispersing any of the magnetizable particulate therein, would have a dynamic mechanical thermal analyzer tangent delta value not greater than 0.1 at a temperature not less than the liquefaction supra point temperature of the thermoplastic.

18. The encoder target precursor of claim 17 wherein the formed material is essentially devoid of curing agent for the uncured elastomer.

19. The encoder target precursor of claim 17 wherein the thermoplastic is selected from the group consisting of thermoplastic elastomer, thermoplastic vulcanizate, and combinations thereof.

20. The encoder target precursor of claim 19 wherein the thermoplastic consists essentially of thermoplastic elastomer, and the thermoplastic comprises from about 1 weight percent to about 99 weight percent of polymer in the polymeric binder.

21. The encoder target precursor of claim 19 wherein the thermoplastic consists essentially of thermoplastic vulcanizate, and the thermoplastic vulcanizate comprises from about 1 weight percent to about 50 weight percent of polymer in the polymeric binder.

22. The encoder target precursor of claim 17 wherein the magnetizable particulate comprises at least one element selected from the group consisting of iron, rare earth metals and combinations thereof.

23. The encoder target precursor of claim 22 wherein the magnetizable particulate consists essentially of a ferrite material, and the magnetizable particulate comprises from about 70 weight percent to about 95 weight percent of the formed material.

24. The encoder target precursor of claim 22 wherein the magnetizable particulate consists essentially of a rare earth metal material, and the magnetizable particulate comprises from about 15 weight percent to about 50 weight percent of the formed material.

25. The encoder target precursor of claim 17 wherein the magnetizable particulate comprises particles, each of essentially all of the particles is independently not greater than 1000 microns minimum essential diameter, and each of at least 50% of the particles is independently not greater than 100 microns minimum essential diameter.

26. The encoder target precursor of claim 17 wherein the uncured elastomer comprises particles, and each of essentially all of the uncured elastomer particles is independently not greater than 100 microns minimum essential diameter.

27. The encoder target precursor of claim 17 wherein the formed material is configured to provide a radial encoder target after curing of the formed material.

28. The encoder target precursor of claim 17 wherein the formed material is configured to provide an axial encoder target after curing of the formed material.

29. The encoder target precursor of claim 17 wherein the formed material is configured to provide a layer in a multi-layer composite.

30. The encoder target precursor of claim 29 wherein the formed material layer is configured to be cohered to an elastic layer, which is cohered to a rigid layer.

31. An encoder target, comprising:
(a) magnetizable particulate dispersed throughout cured polymeric binder; wherein
(b) the polymeric binder is made by radiation curing a dispersion of uncured elastomer in thermoplastic; and
(c) the polymeric binder, if radiation cured without dispersing any of the magnetizable particulate therein, would have a dynamic mechanical thermal analyzer tangent delta value not greater than 0.1 at a temperature not less than the liquefaction supra point temperature of the thermoplastic.

32. The encoder target of claim 31 further comprising
(d) at least one first magnetized portion in said encoder target, said first magnetized portion having a first magnetic field strength; and
(e) at least one second portion in said encoder target, said second portion having a second magnetic field strength differentiated from said first magnetic field strength by not less than about 200 Gauss when measured across an air detection gap of about 1 mm.

33. The encoder target of claim 31 wherein the thermoplastic comprises thermoplastic elastomer.

34. The encoder target of claim 33 wherein the thermoplastic consists essentially of thermoplastic elastomer, and the thermoplastic comprises from about 1 weight percent to about 99 weight percent of polymer in the polymeric binder.

35. The encoder target of claim 31 wherein the magnetizable particulate comprises at least one element selected from the group consisting of iron, rare earth metals, and combinations thereof.

36. The encoder target of claim 35 wherein the magnetizable particulate consists essentially of a ferrite material, and the magnetizable particulate comprises from about 70 weight percent to about 95 weight percent of the encoder target.

37. The encoder target of claim 35 wherein the magnetizable particulate consists essentially of a rare earth metal material, and the magnetizable particulate comprises from about 15 weight percent to about 50 weight percent of the encoder target.

38. The encoder target of claim 31 wherein the magnetizable particulate comprises particles, each of essentially all of the particles is independently not greater than 1000 microns minimum essential diameter, and each of at least 50% of the particles is independently not greater than 100 microns minimum essential diameter.

39. The encoder target of claim 31 wherein elastomer in the encorder target comprises particles and each of essentially all of the particles of elastomer is independently not greater than 100 microns minimum essential diameter.

40. The encoder target of claim 31 wherein the encoder target is a radial encoder target.

41. The encoder target of claim 31 wherein the encoder target is an axial encoder target.

42. The encoder target of claim 31 wherein the encoder target is configured to be a layer in a multilayer composite.

43. The encoder target of claim 42 wherein the encoder target is configured to be cohered to an elastic layer, which is cohered to a rigid layer.

44. An encoder system comprising an encoder target according to claim 31.

45. A method for making an encoder target precursor, comprising:
(a) dispersing uncured elastomer and magnetizable particulate into thermoplastic to prepare a magnetizable blend of the magnetizable particulate distributed throughout a polymeric binder of the uncured elastomer distributed in the thermoplastic; and
(b) forming the magnetizable blend into the encoder target precursor; wherein
(c) the polymeric binder, if cured with radiation without dispersing of any of the magnetizable particulate therein, would have dynamic mechanical thermal analyzer tangent delta value not greater than 0.1 at a temperature not less than the liquefaction supra point temperature of the thermoplastic.

46. The method of claim 45 wherein the dispersing disperses the uncured elastomer in thermoplastic selected from the group consisting of thermoplastic elastomer, thermoplastic vulcanizate, and combinations thereof.

47. The method of claim 46 wherein the thermoplastic consists essentially of thermoplastic elastomer, and the thermoplastic comprises from about 1 weight percent to about 99 weight percent of polymer in the polymeric binder.

48. The method of claim 46 wherein the thermoplastic consists essentially of thermoplastic vulcanizate, and the thermoplastic vulcanizate comprises from about 1 weight percent to about 50 weight percent of polymer in the polymeric binder.

49. The method of claim 45 wherein the dispersing disperses magnetizable particulate comprising at least one element selected from the group consisting of iron, rare earth metals, and combinations thereof.

50. The method of claim 49 wherein the magnetizable particulate consists essentially of a ferrite material, and the magnetizable particulate comprises from about 70 weight percent to about 95 weight percent of the magnetizable blend.

51. The method of claim 49 wherein the magnetizable particulate consists essentially of a rare earth metal material, and the magnetizable particulate comprises from about 15 weight percent to about 50 weight percent of the magnetizable blend.

52. The method of claim 45 wherein the dispersing disperses the magnetizable particulate as particles, and essentially each of all of the dispersed particles is independently not greater than 1000 microns minimum essential diameter, and each of at least 50% of the particles is independently not greater than 100 microns minimum essential diameter.

53. The method of claim 45 wherein the dispersing disperses the uncured elastomer as particles so that each of essentially all of the uncured elastomer particles is independently not greater than 100 microns minimum essential diameter.

54. The method of claim 45 wherein the forming configures the encoder target precursor to provide a radial encoder target after curing of the encoder target precursor.

55. The method of claim 45 wherein the forming configures the encoder target precursor to provide an axial encoder target after curing of the encoder target precursor.

56. The method of claim 45 wherein the forming forms the encoder target precursor as layer in a multilayer composite.

57. The method of claim 56 wherein the forming forms the encoder target precursor as a layer in a multilayer composite and coheres the encoder target precursor layer to an elastic layer that is cohered to a rigid layer.

58. The method of claim 57 wherein the forming forms the encoder target precursor by pultruding.

59. An encoder target precursor made by the method of claim 45.

60. A method for making an encoder target, comprising:
(a) dispersing uncured elastomer and magnetizable particulate into thermoplastic to prepare a magnetizable blend of the magnetizable particulate distributed throughout a polymeric binder of the uncured elastomer distributed in the thermoplastic (b) forming the magnetizable blend into the encoder target precursor;

(c) curing the encoder target precursor with radiation to provide a cured encoder target precursor;

(d) magnetizing at least one first magnetized portion in said cured encoder target precursor such said first magnetized portion has a first magnetic field strength as a remanence; and (e) providing at least one second portion in said cured encoder target precursor, said second portion having a second magnetic field strength differentiated from said first magnetic field strength by not less than about 200 Gauss when measured across an air detection gap of about 1 mm to provide the encoder target; wherein (f) the polymeric binder, if cured with radiation without dispersing of any of the magnetizable particulate therein would have a dynamic mechanical thermal analyzer tangent delta value not greater than 0.1 at a temperature not less than the liquefaction supra point temperature of the thermoplastic.

61. The method of claim 60 wherein the curing uses electron beam radiation.

62. The method of claim 61 wherein the curing uses electron beam radiation from about 0.1 MeRAD to about 100 MeRAD.

63. The method of claim 62 wherein the curing uses electron beam radiation from about 10 MeRAD to about 40 MeRAD.

64. The method of claim 60 wherein the dispersing disperses the uncured elastomer in thermoplastic selected from the group consisting of thermoplastic elastomer, thermoplastic vulcanizate, and combinations thereof.

65. The method of claim 64 wherein the thermoplastic consists essentially of thermoplastic elastomer, and the thermoplastic comprises from about 1 weight percent to about 99 weight percent of polymer in the polymeric binder.

66. The method of claim 64 wherein the thermoplastic consists essentially of thermoplastic vulcanizate, and the thermoplastic vulcanizate comprises from about 1 weight percent to about 50 weight percent of polymer in the polymeric binder.

67. The method of claim 60 wherein the dispersing disperses magnetizable particulate comprising at least one element selected from the group consisting of iron, rare earth metals, and combinations thereof.

68. The method of claim 67 wherein the magnetizable particulate consists essentially of a ferrite material, and the magnetizable particulate comprises from about 70 weight percent to about 95 weight percent of the composition.

69. The method of claim 67 wherein the magnetizable particulate consists essentially of a rare earth metal material, and the magnetizable particulate comprises from about 15 weight percent to about 50 weight percent of the composition.

70. The method of claim 60 wherein the dispersing disperses the magnetizable particulate as particles, and essentially each of all of the dispersed particles is independently not greater than 1000 microns minimum essential diameter, and each of at least 50% of the particles is independently not greater than 100 microns minimum essential diameter.

71. The method of claim 60 wherein the dispersing disperses the uncured elastomer as particles so that each of essentially all of the uncured elastomer particles is independently not greater than 100 microns minimum essential diameter.

72. The method of claim 60 wherein the forming configures the encoder target precursor to provide a radial encoder target after the curing.

73. The method of claim 60 wherein the forming configures the encoder target precursor to provide an axial encoder target after the curing.

74. The method of claim 60 wherein the forming forms the encoder target precursor as a layer in a multilayer composite.

75. The method of claim 74 wherein the forming forms the encoder target precursor as a layer in a multilayer composite and coheres the encoder target precursor layer to an elastic layer cohered to a rigid layer.

76. An encoder target made by the method of claim 60.

* * * * *